United States Patent
Nagaraja et al.

(10) Patent No.: US 10,764,932 B2
(45) Date of Patent: Sep. 1, 2020

(54) BEAM SWITCH AND BEAM FAILURE RECOVERY

(71) Applicant: QUALCOMM Incorporated, San Diego, CA (US)

(72) Inventors: Sumeeth Nagaraja, San Diego, CA (US); Tao Luo, San Diego, CA (US); Yong Li, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/358,560

(22) Filed: Mar. 19, 2019

(65) Prior Publication Data

US 2019/0297648 A1    Sep. 26, 2019

Related U.S. Application Data

(60) Provisional application No. 62/647,525, filed on Mar. 23, 2018.

(51) Int. Cl.
| | |
|---|---|
| *H04W 74/08* | (2009.01) |
| *H04B 7/06* | (2006.01) |
| *H04B 17/336* | (2015.01) |
| *H04B 17/327* | (2015.01) |
| *H04B 7/08* | (2006.01) |

(52) U.S. Cl.
CPC ........ *H04W 74/0841* (2013.01); *H04B 7/063* (2013.01); *H04B 7/0632* (2013.01); *H04B 7/0639* (2013.01); *H04B 7/0695* (2013.01); *H04B 7/088* (2013.01); *H04B 17/327* (2015.01); *H04B 17/336* (2015.01)

(58) Field of Classification Search
CPC ............. H04W 74/0841; H04B 17/327; H04B 17/336; H04B 7/063; H04B 7/0632; H04B 7/0639; H04B 7/0695; H04B 7/088
See application file for complete search history.

(56) References Cited

U.S. PATENT DOCUMENTS

| | | | |
|---|---|---|---|
| 2016/0183234 A1* | 6/2016 | Sung | H04W 72/046 370/329 |
| 2019/0013857 A1* | 1/2019 | Zhang | H04B 7/0626 |
| 2019/0098520 A1* | 3/2019 | Kim | H04B 7/0617 |
| 2019/0104549 A1* | 4/2019 | Deng | H04B 7/0617 |
| 2020/0059398 A1* | 2/2020 | Pan | H04L 41/0654 |

FOREIGN PATENT DOCUMENTS

WO    WO-2017022902 A1    2/2017

OTHER PUBLICATIONS

International Search Report and Written Opinion—PCT/US2019/023240—ISA/EPO—dated May 28, 2019.

\* cited by examiner

*Primary Examiner* — Freshteh N Aghdam
(74) *Attorney, Agent, or Firm* — Qualcomm Incorporated

(57) ABSTRACT

Methods, systems, and devices for wireless communications are described. One method may include receiving a beam switch message prior to initiating a physical random access channel (PRACH) procedure, monitoring for a response from a base station using a candidate beam during a random access response window, identifying a beam switch event occurring within the random access response window based on beam switch timing information indicated in the beam switch message, and performing a beam switch procedure based on an absence of a response from the base station during a portion of the random access response window and prior to the beam switch event.

30 Claims, 19 Drawing Sheets

BEAM SWITCH AND BEAM FAILURE RECOVERY

CROSS REFERENCES

The present application for patent claims the benefit of U.S. Provisional Patent Application No. 62/647,525 by NAGARAJA, et al., entitled "BEAM SWITCH AND BEAM FAILURE RECOVERY," filed Mar. 23, 2018, assigned to the assignee hereof, and expressly incorporated herein by reference in its entirety.

BACKGROUND

The present disclosure relates generally to wireless communication, and more specifically to beam switch and beam failure recovery.

Wireless communications systems are widely deployed to provide various types of communication content such as voice, video, packet data, messaging, broadcast, and so on. These systems may be capable of supporting communication with multiple users by sharing the available system resources (e.g., time, frequency, or power). Examples of such multiple-access systems include fourth generation (4G) systems such as Long Term Evolution (LTE) systems employing LTE technology (e.g., technologies utilizing licensed spectrum LTE protocols or versions of LTE protocols customized for use wholly or partially in the unlicensed spectrum), LTE-Advanced (LTE-A) systems, or LTE-A Pro systems, and fifth generation (5G) systems which may be referred to as New Radio (NR) systems, which may be employed in the unlicensed spectrum including frequency bands traditionally used by Wi-Fi technology (e.g., technology using IEEE 802.11 communication protocol). These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Some wireless communications systems may support beamformed transmissions and multi-beam operation for communications between a base station and a UE. In some cases, an active beam pair between the base station and the UE may become misaligned, which may result in beam or communication failure. The base station and the UE may perform a beam management procedure such as beam switch procedure or a beam failure recovery procedure to mitigate the beam or communication failure. The beam management procedures may be associated with additional overhead and increased latency.

SUMMARY

The described techniques relate to improved methods, systems, devices, or apparatuses that support beam switch and beam failure recovery. A user equipment (UE) may receive a beam switch message from a base station prior to initiating a physical random access channel (PRACH) procedure. As part of the PRACH procedure, the UE may monitor beam failure recovery control channel elements for a response from the base station using a candidate beam. The beam failure recovery control channel elements may be monitored during a random access response window. The UE may also identify a beam switch event occurring within the random access response window based on beam switch timing information indicated in the beam switch message received from the base station. As a result, the UE may perform a beam switch procedure based on an absence of a response from the base station during a portion of the random access response window and prior to the beam switch event. Alternatively, the UE may ignore the beam switch event based on receiving the response prior to the beam switch event.

A method of wireless communication at a UE is described. The method may include receiving a beam switch message prior to initiating a PRACH procedure, monitoring for a response from a base station using a candidate beam during a random access response window, identifying a beam switch event occurring within the random access response window based at least in part on beam switch timing information indicated in the beam switch message, and performing a beam switch procedure based at least in part on an absence of a response from the base station during a portion of the random access response window and prior to the beam switch event.

An apparatus for wireless communication is described. The apparatus may include means for receiving a beam switch message prior to initiating a PRACH procedure, means for monitoring for a response from a base station using a candidate beam during a random access response window, means for identifying a beam switch event occurring within the random access response window based at least in part on beam switch timing information indicated in the beam switch message, and means for performing a beam switch procedure based at least in part on an absence of a response from the base station during a portion of the random access response window and prior to the beam switch event.

Another apparatus for wireless communication is described. The apparatus may include a processor, memory coupled with the processor, and instructions stored in the memory. The instructions may be operable to cause the processor to receive a beam switch message prior to initiating a PRACH procedure, monitor for a response from a base station using a candidate beam during a random access response window, identify a beam switch event occurring within the random access response window based at least in part on beam switch timing information indicated in the beam switch message, and perform a beam switch procedure based at least in part on an absence of a response from the base station during a portion of the random access response window and prior to the beam switch event.

A non-transitory computer-readable medium for wireless communication is described. The non-transitory computer-readable medium may include instructions operable to cause a processor to receive a beam switch message prior to initiating a PRACH procedure, monitor for a response from a base station using a candidate beam during a random access response window, identify a beam switch event occurring within the random access response window based at least in part on beam switch timing information indicated in the beam switch message, and perform a beam switch procedure based at least in part on an absence of a response from the base station during a portion of the random access response window and prior to the beam switch event.

Some examples of the method, apparatus, and non-transitory computer-readable medium described above may further include processes, features, means, or instructions for monitoring, after initiating the physical random access channel (PRACH) procedure, a search space of a control resource set for downlink control information for the UE. In some examples of the method, apparatus, and non-transitory computer-readable medium described above, the monitoring for the response from the base station using the candidate beam may include monitoring at least one control channel element of the control resource set for the response. Some examples of the method, apparatus, and non-transitory computer-readable medium described above may further include processes, features, means, or instructions for monitoring the search space for the downlink control information prior to initiating the PRACH procedure. Some examples of the method, apparatus, and non-transitory computer-readable medium described above may further include processes, features, means, or instructions for detecting a beam failure instance associated with an active beam, incrementing a beam failure counter based at least in part on the detected beam failure instance, determining whether the beam failure counter meets a maximum beam failure threshold, determining a beam failure event based at least in part on the beam failure counter meeting the maximum beam failure threshold, and triggering a beam failure recovery procedure based at least in part on the determined beam failure event.

Some examples of the method, apparatus, and non-transitory computer-readable medium described above may further include processes, features, means, or instructions for receiving, from the base station, the response via the candidate beam prior to the beam switch event, and ignoring the beam switch event based at least in part on receiving the response prior to the beam switch event.

Some examples of the method, apparatus, and non-transitory computer-readable medium described above may further include processes, features, means, or instructions for triggering the PRACH procedure based at least in part on a beam failure event.

Some examples of the method, apparatus, and non-transitory computer-readable medium described above may further include processes, features, means, or instructions for monitoring for a response via a target beam indicated in the beam switch message, from the base station, during a time period associated with the beam switch event.

Some examples of the method, apparatus, and non-transitory computer-readable medium described above may further include processes, features, means, or instructions for receiving, from the base station, the response via the target beam, prior to the time period associated with the beam switch event lapsing.

Some examples of the method, apparatus, and non-transitory computer-readable medium described above may further include processes, features, means, or instructions for suspending a remainder portion of the random access response window based at least in part on receiving the response via the target beam prior to the time period lapsing.

Some examples of the method, apparatus, and non-transitory computer-readable medium described above may further include processes, features, means, or instructions for transmitting, via a physical layer, an indication to an upper layer to receive a response from the base station, where suspending the remainder portion of the random access response window is based at least in part on the indication.

Some examples of the method, apparatus, and non-transitory computer-readable medium described above may further include processes, features, means, or instructions for continuing monitoring for the response, from the base station during a remainder portion of the random access response window using the candidate beam.

A method of wireless communication at a base station is described. The method may include receiving, from a UE a preamble transmission over a candidate beam identified by the UE after transmitting, to the UE, a beam switch message comprising beam switch timing information indicating the time period of the beam switch event, and a request for the UE to switch from communicating with the base station using an active beam to communicating with the base station using a target beam, and performing a beam switch procedure based at least in part on an absence of a response from the base station during a portion of the random access response window and prior to the beam switch event.

An apparatus for wireless communication is described. The apparatus may include means for receiving, from a UE a preamble transmission over a candidate beam identified by the UE after transmitting, to the UE, a beam switch message comprising beam switch timing information indicating the time period of the beam switch event, and a request for the UE to switch from communicating with the apparatus using an active beam to communicating with the apparatus using a target beam, and means for performing a beam switch procedure based at least in part on an absence of a response from the apparatus during a portion of the random access response window and prior to the beam switch event.

Another apparatus for wireless communication is described. The apparatus may include a processor, memory coupled with the processor, and instructions stored in the memory. The instructions may be operable to cause the processor to receive, from a UE a preamble transmission over a candidate beam identified by the UE after transmitting, to the UE, a beam switch message comprising beam switch timing information indicating the time period of the beam switch event, and a request for the UE to switch from communicating with the apparatus using an active beam to communicating with the apparatus using a target beam, and perform a beam switch procedure based at least in part on an absence of a response from the apparatus during a portion of the random access response window and prior to the beam switch event.

A non-transitory computer-readable medium for wireless communication is described. The non-transitory computer-readable medium may include instructions operable to cause a processor to receive, from a UE a preamble transmission over a candidate beam identified by the UE after transmitting, to the UE, a beam switch message comprising beam switch timing information indicating the time period of the beam switch event, and a request for the UE to switch from communicating with a base station using an active beam to communicating with the base station using a target beam, and perform a beam switch procedure based at least in part on an absence of a response from the base station during a portion of the random access response window and prior to the beam switch event.

Some examples of the method, apparatus, and non-transitory computer-readable medium described above may further include processes, features, means, or instructions for ignoring the beam switch event based at least in part on transmitting the response to the UE over the candidate beam prior to the beam switch event.

Some examples of the method, apparatus, and non-transitory computer-readable medium described above may further include processes, features, means, or instructions for configuring a beam failure recovery control channel for transmitting a response to the UE using a candidate beam.

Some examples of the method, apparatus, and non-transitory computer-readable medium described above may further include processes, features, means, or instructions for transmitting, to the UE, the response via the candidate beam during a portion of a random access response window and prior to the beam switch event.

Some examples of the method, apparatus, and non-transitory computer-readable medium described above may further include processes, features, means, or instructions for transmitting, to the UE, the response via the candidate beam after the time period of the beam switch event lapsing and within a random access response window.

Some examples of the method, apparatus, and non-transitory computer-readable medium described above may further include processes, features, means, or instructions for transmitting, to the UE, the response via the target beam, prior to the time period of the beam switch event lapsing.

Some examples of the method, apparatus, and non-transitory computer-readable medium described above may further include processes, features, means, or instructions for performing the beam switch procedure with the UE during the beam switch event, monitoring a reference signal associated with the target beam, where the reference signal is received prior to the time period of the beam switch event lapsing, measuring a quality of the reference signal, and comparing the quality of the reference signal to a threshold.

Some examples of the method, apparatus, and non-transitory computer-readable medium described above may further include processes, features, means, or instructions for performing a beam failure recovery procedure with the UE based at least in part on the quality of the reference signal satisfying the threshold.

In some examples of the method, apparatus, and non-transitory computer-readable medium described above, the reference signal comprises a synchronization signal block (SSB) reference signal, or a physical broadcast channel (PBCH) block reference signal, or a channel state information (CSI) reference signal, or a sounding reference signal (SRS), or a beam reference signal (BRS), or a beam refinement reference signal (BRRS), or a tracking reference signal (TRS), or a combination thereof.

In some examples of the method, apparatus, and non-transitory computer-readable medium described above, the threshold comprises a reference received signal power (RSRP), a reference signal received quality (RSRQ), or a block error rate (BLER), or a combination thereof.

Another method for wireless communication at a UE is described. The method may include detecting a beam failure event associated with an active beam for communicating with a base station, identifying a candidate beam for performing a beam failure recovery procedure based at least in part on the determined beam failure event, receiving, from the base station after detecting the beam failure event, a beam switch message requesting the UE to perform a beam switch procedure, where the beam switch procedure comprises the UE switching from communicating with the base station using the active beam to communicating with the base station using a target beam, and determining to perform the beam failure recovery procedure or the beam switch procedure in response to receiving the beam switch message after detecting the beam failure event, the determination based at least in part on a signal quality associated with the candidate beam and the target beam.

Another apparatus for wireless communication is described. The apparatus may include means for detecting a beam failure event associated with an active beam for communicating with a base station, means for identifying a candidate beam for performing a beam failure recovery procedure based at least in part on the determined beam failure event, means for receiving, from the base station after detecting the beam failure event, a beam switch message requesting the apparatus to perform a beam switch procedure, where the beam switch procedure comprises the apparatus switching from communicating with the base station using the active beam to communicating with the base station using a target beam, and means for determining to perform the beam failure recovery procedure or the beam switch procedure in response to receiving the beam switch message after detecting the beam failure event, the determination based at least in part on a signal quality associated with the candidate beam and the target beam.

Another apparatus for wireless communication is described. The apparatus may include a processor, memory coupled with the processor, and instructions stored in the memory. The instructions may be operable to cause the processor to detect a beam failure event associated with an active beam for communicating with a base station, identify a candidate beam for performing a beam failure recovery procedure based at least in part on the determined beam failure event, receive, from the base station after detecting the beam failure event, a beam switch message requesting the apparatus to perform a beam switch procedure, where the beam switch procedure comprises the apparatus switching from communicating with the base station using the active beam to communicating with the base station using a target beam, and determine to perform the beam failure recovery procedure or the beam switch procedure in response to receiving the beam switch message after detecting the beam failure event, the determination based at least in part on a signal quality associated with the candidate beam and the target beam.

A non-transitory computer-readable medium for wireless communication at an apparatus is described. The non-transitory computer-readable medium may include instructions operable to cause a processor to detect a beam failure event associated with an active beam for communicating with a base station, identify a candidate beam for performing a beam failure recovery procedure based at least in part on the determined beam failure event, receive, from the base station after detecting the beam failure event, a beam switch message requesting the apparatus to perform a beam switch procedure, where the beam switch procedure comprises the apparatus switching from communicating with the base station using the active beam to communicating with the base station using a target beam, and determine to perform the beam failure recovery procedure or the beam switch procedure in response to receiving the beam switch message after detecting the beam failure event, the determination based at least in part on a signal quality associated with the candidate beam and the target beam.

Some examples of the method, apparatus, and non-transitory computer-readable medium described above may further include processes, features, means, or instructions for measuring a quality of a reference signal associated with each of the candidate beam and the target beam, and comparing a quality of the reference signal associated with the candidate beam to a quality of the reference signal associated with the target beam, where the quality of the reference signal comprises a reference received signal power (RSRP), a reference signal received quality (RSRQ), or a block error rate (BLER), or a combination thereof, where determining to perform the beam failure recovery procedure or the beam switch procedure is based at least in part on the comparing.

Some examples of the method, apparatus, and non-transitory computer-readable medium described above may further include processes, features, means, or instructions for performing the beam failure recovery procedure based at least in part on the quality of the reference signal associated with the candidate beam being above a threshold compared to the quality of the reference signal associated with the target beam, where the threshold is preconfigured by the base station.

Some examples of the method, apparatus, and non-transitory computer-readable medium described above may further include processes, features, means, or instructions for performing the beam switch procedure based at least in part on the quality of the reference signal associated with the target beam being above a threshold compared to the quality of the reference signal associated with the candidate beam, where the threshold is preconfigured by the base station.

Some examples of the method, apparatus, and non-transitory computer-readable medium described above may further include processes, features, means, or instructions for performing the beam switch procedure based at least in part on the beam switch message being carried over a physical downlink control channel (PDCCH).

Some examples of the method, apparatus, and non-transitory computer-readable medium described above may further include processes, features, means, or instructions for transmitting, to the base station, a physical random access channel (PRACH) requesting the beam failure recovery procedure on the candidate beam.

Some examples of the method, apparatus, and non-transitory computer-readable medium described above for detecting the beam failure event may further include processes, features, means, or instructions for detecting a beam failure instance associated with the active beam, incrementing a beam failure counter based at least in part on the detected beam failure instance, determining whether the beam failure counter meets a maximum beam failure threshold, where determining the beam failure event is based at least in part on the beam failure counter meeting the maximum beam failure threshold, and triggering the beam failure recovery procedure based at least in part on the determined beam failure event.

Some examples of the method, apparatus, and non-transitory computer-readable medium described above may further include processes, features, means, or instructions for monitoring a reference signal associated with the active beam, where the active beam corresponds to a physical downlink control channel (PDCCH) control beam, and comparing the reference signal to a threshold, where detecting the beam failure instance is based at least in part on the reference signal satisfying the threshold.

In some examples of the method, apparatus, and non-transitory computer-readable medium described above, the reference signal comprises a synchronization signal block (SSB) reference signal, or a physical broadcast channel (PBCH) block reference signal, or a channel state information (CSI) reference signal, or a sounding reference signal (SRS), or a beam reference signal (BRS), or a beam refinement reference signal (BRRS), or a tracking reference signal (TRS), or a combination thereof.

In some examples of the method, apparatus, and non-transitory computer-readable medium described above, the threshold comprises a reference received signal power (RSRP), a reference signal received quality (RSRQ), or a block error rate (BLER), or a combination thereof.

Another method for wireless communication at a UE is described. The method may include receiving, from a base station, a beam switch message comprising beam switch timing information and a request for the UE to perform a beam switch procedure, during a beam switch event based at least in part on the beam switch timing information, the beam switch procedure comprising the UE switching from communicating with the base station using an active beam to communicating with the base station using a target beam, and determining to initiate a PRACH transmission based at least in part on the beam switch timing information and receiving, from the base station, a response on the target beam.

Another apparatus for wireless communication is described. The apparatus may include means for receiving, from a base station, a beam switch message comprising beam switch timing information and a request for the apparatus to perform a beam switch procedure, during a beam switch event based at least in part on the beam switch timing information, the beam switch procedure comprising the apparatus switching from communicating with the base station using an active beam to communicating with the base station using a target beam, and means for determining to initiate a PRACH transmission based at least in part on the beam switch timing information and receiving, from the base station, a response on the target beam.

Another apparatus for wireless communication is described. The apparatus may include a processor, memory coupled with the processor, and instructions stored in the memory. The instructions may be operable to cause the processor to receive, from a base station, a beam switch message comprising beam switch timing information and a request for the apparatus to perform a beam switch procedure, during a beam switch event based at least in part on the beam switch timing information, the beam switch procedure comprising the apparatus switching from communicating with the base station using an active beam to communicating with the base station using a target beam, and determine to initiate a PRACH transmission based at least in part on the beam switch timing information and receiving, from the base station, a response on the target beam.

A non-transitory computer-readable medium for wireless communication at an apparatus is described. The non-transitory computer-readable medium may include instructions operable to cause a processor to receive, from a base station, a beam switch message comprising beam switch timing information and a request for the apparatus to perform a beam switch procedure, during a beam switch event based at least in part on the beam switch timing information, the beam switch procedure comprising the apparatus switching from communicating with the base station using an active beam to communicating with the base station using a target beam, and determine to initiate a PRACH transmission based at least in part on the beam switch timing information and receiving, from the base station, a response on the target beam.

Some examples of the method, apparatus, and non-transitory computer-readable medium described above may further include processes, features, means, or instructions for determining a pending PRACH transmission based at least in part on receiving the beam switch message.

Some examples of the method, apparatus, and non-transitory computer-readable medium described above may further include processes, features, means, or instructions for receiving, from the base station, the response on the target beam after the beam switch event, and ignoring the pending PRACH transmission based at least in part on receiving the response before the beam switch event.

Some examples of the method, apparatus, and non-transitory computer-readable medium described above may further include processes, features, means, or instructions for performing the beam switch procedure during the beam switch event, monitoring a reference signal associated with the target beam, where the response comprises the reference signal, measuring a quality of the reference signal, and comparing the quality of the reference signal to a threshold, where the threshold comprises a reference received signal power (RSRP), a reference signal received quality (RSRQ), or a block error rate (BLER), or a combination thereof.

Some examples of the method, apparatus, and non-transitory computer-readable medium described above may further include processes, features, means, or instructions for transmitting the pending PRACH transmission based at least in part on the quality of the reference signal being below the threshold.

Some examples of the method, apparatus, and non-transitory computer-readable medium described above may further include processes, features, means, or instructions for performing a beam failure recovery procedure based at least in part on the transmitting.

Some examples of the method, apparatus, and non-transitory computer-readable medium described above may further include processes, features, means, or instructions for receiving, from the base station, the response on the target beam before the beam switch event, and initiating the PRACH transmission based at least in part on receiving the response before the beam switch event.

Some examples of the method, apparatus, and non-transitory computer-readable medium described above may further include processes, features, means, or instructions for detecting a beam failure instance associated with the active beam, incrementing a beam failure counter based at least in part on the detected beam failure instance, determining whether the beam failure counter meets a maximum beam failure threshold, determining a beam failure event based at least in part on the beam failure counter meeting the maximum beam failure threshold, and triggering a beam failure recovery procedure based at least in part on the determined beam failure event.

Some examples of the method, apparatus, and non-transitory computer-readable medium described above may further include processes, features, means, or instructions for monitoring a reference signal associated with the active beam, where the response comprises the reference signal, and comparing the reference signal to a threshold, where detecting the beam failure instance is based at least in part on the reference signal satisfying the threshold.

In some examples of the method, apparatus, and non-transitory computer-readable medium described above, the reference signal comprises a synchronization signal block (SSB) reference signal, or a physical broadcast channel (PBCH) block reference signal, or a channel state information (CSI) reference signal, or a sounding reference signal (SRS), or a beam reference signal (BRS), or a beam refinement reference signal (BRRS), or a tracking reference signal (TRS), or a combination thereof.

In some examples of the method, apparatus, and non-transitory computer-readable medium described above, the threshold comprises a reference received signal power (RSRP), a reference signal received quality (RSRQ), or a block error rate (BLER), or a combination thereof.

Some examples of the method, apparatus, and non-transitory computer-readable medium described above may further include processes, features, means, or instructions for determining that the beam switch event is scheduled to occur after the PRACH transmission or a random access response window based at least in part on the beam switch timing information, where triggering the beam failure recovery procedure is based at least in part on the beam switch event being scheduled to occur after the PRACH transmission or the random access response window.

A method for wireless communication at a base station. The method may include receiving, from a UE, a beam failure indication associated with an active beam for communicating with the UE, identifying a target beam based at least in part on the beam failure indication, and transmitting, to the UE, a beam switch message comprising beam switch timing information and a request for the UE to perform a beam switch procedure, during a beam switch event based at least in part on the beam switch timing information, the beam switch procedure comprising the UE switching from communicating with the base station using the active beam to communicating with the base station using the target beam.

An apparatus for wireless communication is described. The apparatus may include means for receiving, from a UE, a beam failure indication associated with an active beam for communicating with the UE, means for identifying a target beam based at least in part on the beam failure indication, and means for transmitting, to the UE, a beam switch message comprising beam switch timing information and a request for the UE to perform a beam switch procedure, during a beam switch event based at least in part on the beam switch timing information, the beam switch procedure comprising the UE switching from communicating with the apparatus using the active beam to communicating with the apparatus using the target beam.

Another apparatus for wireless communication is described. The apparatus may include a processor, memory coupled with the processor, and instructions stored in the memory. The instructions may be operable to cause the processor to receive, from a UE, a beam failure indication associated with an active beam for communicating with the UE, identify a target beam based at least in part on the beam failure indication, and transmit, to the UE, a beam switch message comprising beam switch timing information and a request for the UE to perform a beam switch procedure, during a beam switch event based at least in part on the beam switch timing information, the beam switch procedure comprising the UE switching from communicating with the apparatus using the active beam to communicating with the apparatus using the target beam.

A non-transitory computer-readable medium for wireless communication at an apparatus is described. The non-transitory computer-readable medium may include instructions operable to cause a processor to receive, from a UE, a beam failure indication associated with an active beam for communicating with the UE, identify a target beam based at least in part on the beam failure indication, and transmit, to the UE, a beam switch message comprising beam switch timing information and a request for the UE to perform a beam switch procedure, during a beam switch event based at least in part on the beam switch timing information, the beam switch procedure comprising the UE switching from communicating with the apparatus using the active beam to communicating with the apparatus using the target beam.

Some examples of the method, apparatus, and non-transitory computer-readable medium described above may further include processes, features, means, or instructions for performing the beam switch procedure with the UE during the beam switch event, monitoring a reference signal associated with the target beam, measuring a quality of the reference signal, and comparing the quality of the reference signal to a threshold.

Some examples of the method, apparatus, and non-transitory computer-readable medium described above may further include processes, features, means, or instructions for performing a beam failure recovery procedure with the UE based at least in part on the quality of the reference signal satisfying the threshold.

In some examples of the method, apparatus, and non-transitory computer-readable medium described above, the reference signal comprises a synchronization signal block (SSB) reference signal, or a physical broadcast channel (PBCH) block reference signal, or a channel state information (CSI) reference signal, or a sounding reference signal (SRS), or a beam reference signal (BRS), or a beam refinement reference signal (BRRS), or a tracking reference signal (TRS), or a combination thereof.

In some examples of the method, apparatus, and non-transitory computer-readable medium described above, the threshold comprises a reference received signal power (RSRP), a reference signal received quality (RSRQ), or a block error rate (BLER), or a combination thereof.

DETAILED DESCRIPTION

A base station and a UE may perform a beam management procedure such as, a beam switch procedure or a beam failure recovery procedure. In an example beam switch procedure, a base station may configure one or more reference signals. A subset of the reference signals may be used by the UE to monitor downlink and uplink control or data channels, while another subset may be used to identify candidate beams, e.g., satisfying a threshold. For example, a UE may monitor a new radio synchronization signal (NR-SS) or a channel state information reference signal (CSI-RS) based beam. The UE may measure a signal quality of the configured reference signals, e.g., NR-SS or CSI-RS and transmit a report of the signal quality to the base station. Based on the report, the base station may transmit a beam switch message to the UE on a physical downlink control channel (PDCCH), a medium access control (MAC) control element (CE), or radio resource control (RRC) signaling, or a combination thereof. Upon receiving the beam switch message, the base station and the UE may establish communication over the newly indicated beam. Alternatively, in an example beam failure recovery procedure, the UE may identify a link issue, e.g., a metric of a communication beam may be below a threshold. The UE may transmit an indication to the base station of a candidate beam (e.g., a new synchronization signal block (SSB) reference signal or CSI-RS) when beam failure is detected on the active beam.

In some scenarios, the UE may identify a beam failure event and transmit a beam failure recovery request to the base station on available uplink resources (e.g., time and frequency resources). Additionally, the base station may also transmit a beam switch message to the UE requesting the UE to switch from the active beam to another beam (e.g., target beam). Thereby, in some cases the UE may perform both procedures. This may introduce unnecessary overhead and latency in a wireless communications system. As a result, it may be advantageous for the UE to support selection and prioritization between the beam switch procedure and the beam failure recovery procedure, to improve communication range, a signal quality, or a spectral efficiency, and reduce overhead and latency.

Aspects of the disclosure are initially described in the context of a wireless communications system. Aspects of the disclosure are further illustrated by and described with reference to timing diagrams and process flows. Aspects of the disclosure are further illustrated by and described with reference to apparatus diagrams, system diagrams, and flowcharts that relate to beam switch and beam failure recovery.

Figure 1:
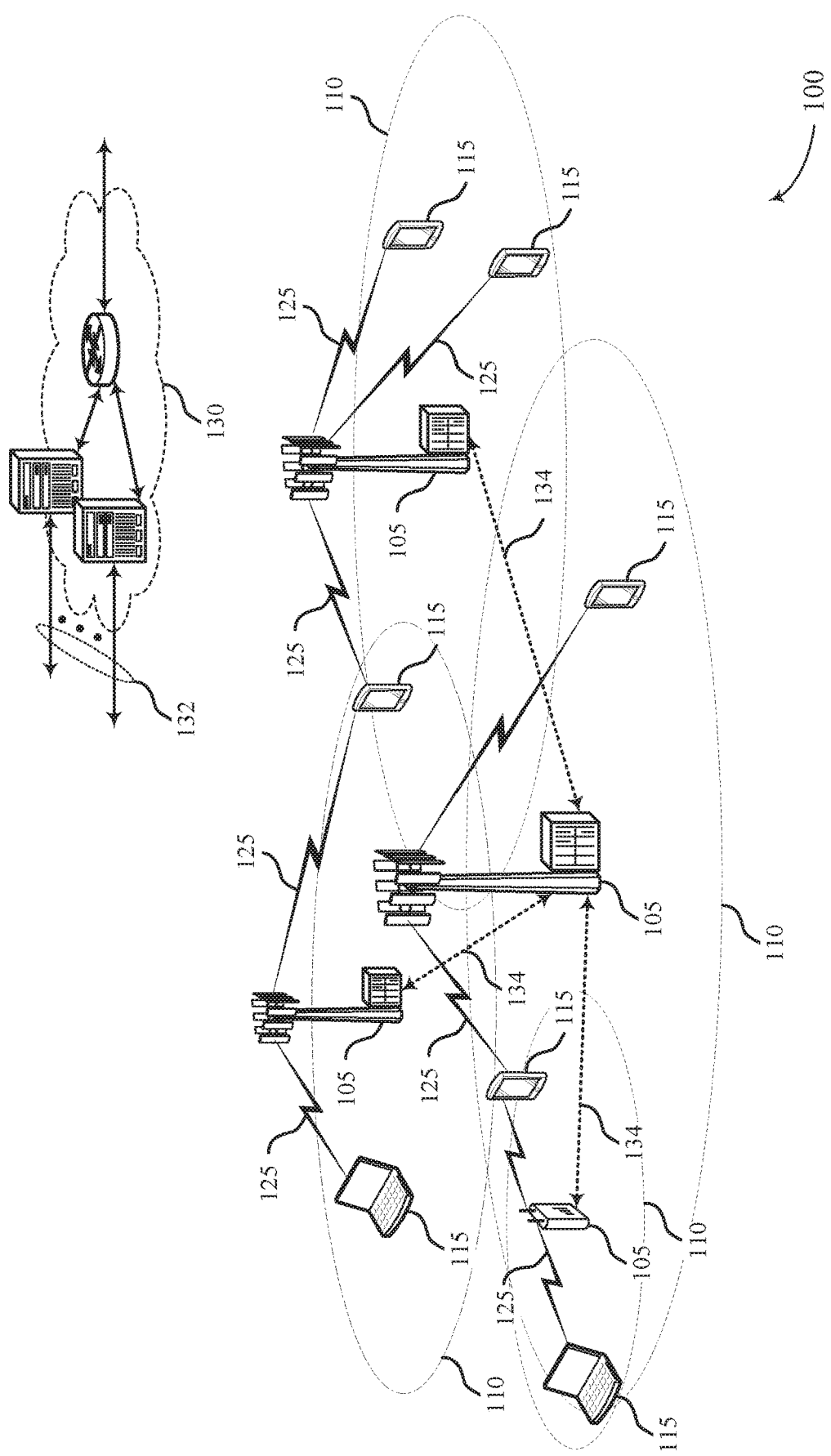
FIGS. 1 and 2 illustrate examples of a wireless communications system that supports beam switch and beam failure recovery in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, or the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (JMTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. The unlicensed spectrum may include frequency bands traditionally used by Wi-Fi technology (e.g., technology using IEEE 802.11 communication protocols), such as the 5 GHz band, the 2.4 GHz band, the 60 GHz band, the 3.6 GHz band, and/or the 900 MHz band. The unlicensed spectrum may also include other frequency bands. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying predetermined amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, a base station 105 and a UE 115 may perform a beam management procedure such as, a beam switch procedure or a beam failure recovery procedure. In an example beam switch procedure, a base station 105 may configure one or more reference signals, e.g., SRS, BRS, CSI, or TRS. A subset of the reference signals may be used by a UE 115 to monitor downlink and uplink control or data channels, while another subset may be used to identify candidate beams, e.g., satisfying the threshold. The UE 115 may measure a signal quality of the configured reference signals and transmit a report of the signal quality to the base station 105. Based on the report, the base station 105 may transmit a beam switch message to the UE 115 on a physical downlink control channel (PDCCH), a medium access control (MAC) control element (CE), or radio resource control (RRC) signaling, or a combination thereof. Upon receiving the beam switch message, the base station 105 and the UE 115 may establish communication over the newly indicated beam. In an example beam failure recovery procedure, the UE 115 may identify a link issue, e.g., a metric of a communication beam may be below a threshold. The UE 115 may transmit an indication to the base station 105 of a candidate beam (e.g., a new synchronization signal block (SSB) reference signal or CSI-RS) when beam failure is detected on the active beam.

In some scenarios, the UE 115 may identify a beam failure event and trigger a beam failure response transmission to the base station 105 on available uplink resources (e.g., time and frequency resources). Additionally, the base station 105 may also transmit a beam switch message to the UE 115 requesting the UE 115 to switch from the active beam to another beam (e.g., target beam). Thereby, in some cases the UE 115 may perform both procedures. This may introduce unnecessary overhead and latency in the wireless communications system 100. As such, the UE 115 may support selection and prioritization between the beam switch procedure and the beam failure recovery procedure, to improve communication range, a signal quality, or a spectral efficiency, and reduce overhead and latency in the wireless communications system 100.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Figure 2:
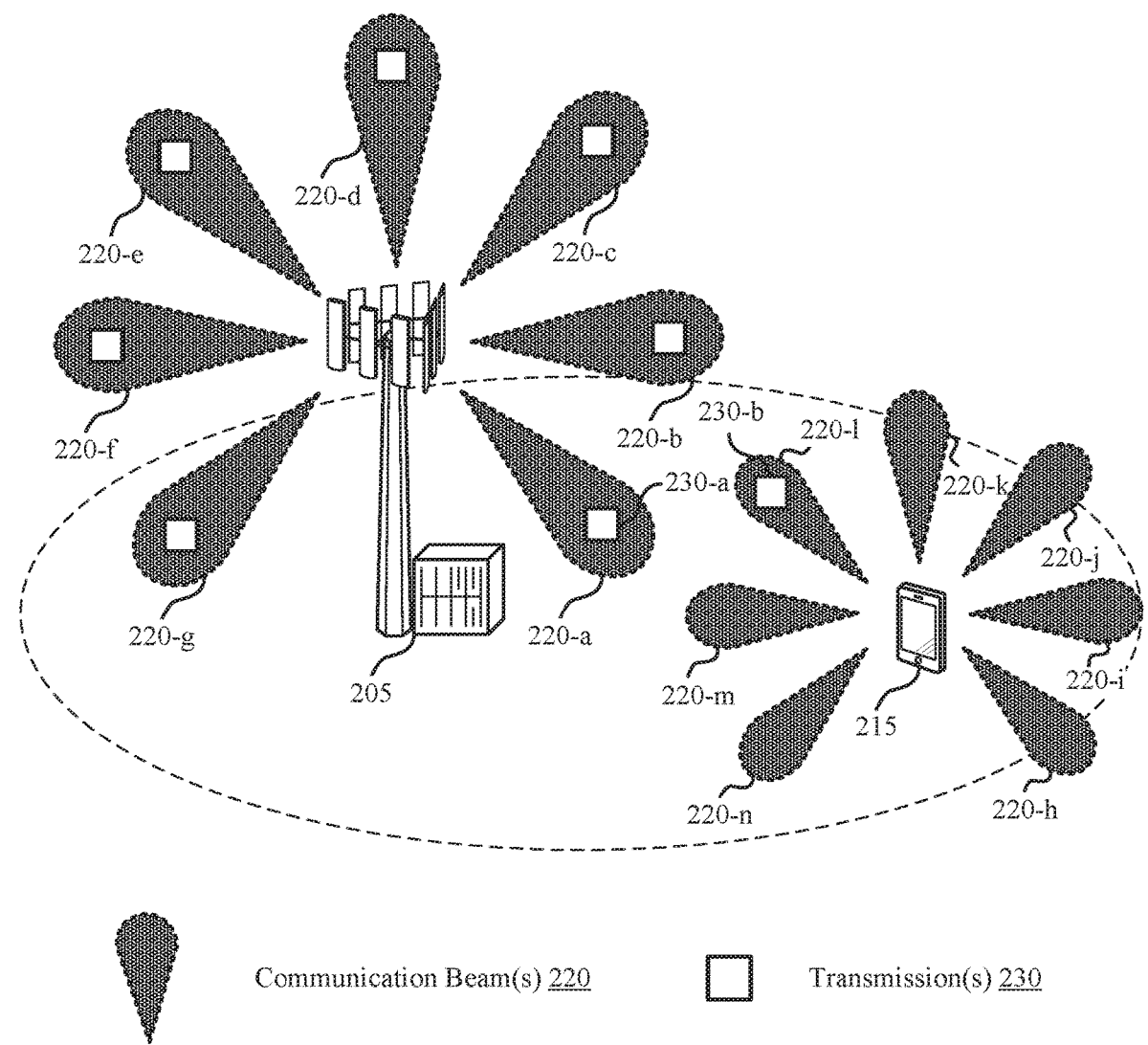

FIG. 2 illustrates an example of a wireless communications system 200 that supports beam switch and beam failure recovery in accordance with various aspects of the present disclosure. In some examples, the wireless communications system 200 may implement aspects of the wireless communications system 100. The wireless communications system 200 may include a base station 205 and a UE 215, which may be examples of the corresponding devices described with reference to FIG. 1. Some examples of the wireless communications system 200 may support selection or prioritization between a beam management procedure such as, a beam switch procedure and a beam failure recovery procedure, to improve communication range, a signal quality, or a spectral efficiency, and reduce overhead and latency in the wireless communications system 200.

The base station 205 may perform a radio resource control (RRC) procedure (e.g., cell acquisition procedure, random access procedure, RRC connection procedure, RRC configuration procedure) with the UE 215. The base station 205 may be configured with multiple antennas, which may be used for directional or beamformed transmissions (e.g., beamformed communication beams 220-a through 220-g). In some examples, the RRC procedure may include a beam sweep procedure. The beam sweep procedure may provide the base station 205 and the UE 215 with a suitable communication beam 220 for communication. As illustrated in FIG. 2, the base station 205 may transmit a number of beamformed communication beams 220-a through 220-g in different directions within a coverage area. Additionally, the UE 215 may also be configured with multiple antennas, which may be used for directional or beamformed transmissions (e.g., beamformed communication beams 220-h through 220-n).

As part of the beam sweep procedure, the base station 205 may transmit a plurality of transmissions 230 to the UE 215. The transmissions 230 may include one or more reference signals. The reference signals may be transmitted using different beamformed transmissions (e.g., beamformed communication beams 220-a through 220-g). Each beamformed transmission may have an associated beam identifier, beam direction, beam symbols, and the like. Examples of the reference signals may include synchronization signals (e.g., NR-SS, primary synchronization signal (PSS), secondary synchronization signal (SSS), and the like), channel performance reference signals (e.g., CSI-RS, demodulation reference signals (DMRSs)), broadcast beams (e.g., physical channel broadcast channel (PBCH) beams), beam refinement beams, or any combinations of such reference signals. The UE 215 may be capable of receiving the transmissions 230 from the base station 205 during a slot, a transmission time interval (TTI), a shortened-TTI (s-TTI), a subframe, or a frame, etc.

The base station 205 and the UE 215 may select a communication beam 220 for communication based on the beam sweep procedure. The communication beam 220 may be referred to as an active data beam or control beam, or both. The base station 205 and the UE 215 may communicate downlink and uplink over the active beam. In some cases, the communication beam 220 may also have reciprocity properties. For example, a downlink communication beam 220-a from the base station 205 may have a reciprocity with an uplink communication beam 220-l from the UE 215.

In some cases, the base station 205 or the UE 215, or both may identify or otherwise determine that an active beam (e.g., communication beam 220-a or communication beam 220-l) is operating below a threshold, e.g., based on one or more criteria associated with the active beam failing to satisfy a quality threshold. For example, the UE 215 may determine that a reference received signal power (RSRP), a reference signal received quality (RSRQ), or a block error rate (BLER), or a combination thereof has fallen below the threshold, and this may trigger a beam switch procedure or a beam failure recovery procedure. For example, in response to the active beam operating below the threshold, the base station 205 and the UE 215 may switch to a new beam using a beam management procedure such as a beam switch procedure.

In some scenarios, the UE 215 may identify a beam failure event and trigger a beam failure response transmission to the base station 205 on available uplink resources (e.g., time and frequency resources). Additionally, in the interim, the base station 205 may also transmit a beam switch message to the UE 215 commanding the UE 215 to switch from the active beam to another beam (e.g., target beam). Thereby, in some cases the UE 215 may perform both procedures. This may introduce unnecessary overhead and latency in the wireless communications system 200. For example, the UE 215 may be faced with a situation in which the UE 215 is to monitor for a response (e.g., including reference signal associated with the target beam indicated in the beam switch message 340) in CORESETs associated with the target beam while the UE 215 is monitoring for a random access response transmitted by the base station 205 in the CORESETs associated with the candidate beam. As such, the UE 215 may be monitoring for responses in two different directions, thereby increasing the resource overhead, power consumption, or latency at the UE 215. Thus, a mechanism for the UE 215 to determine which beam management procedure (e.g., beam switch procedure or beam failure recovery procedure) the UE 215 is to continue may reduce such resource overhead, power consumption, or latency at the UE 215. As such, the UE 215 may support selection and prioritization between the beam switch procedure and the beam failure recovery procedure, to improve communication range, a signal quality, or a spectral efficiency, and reduce overhead and latency in the wireless communications system 200.

Figure 3:
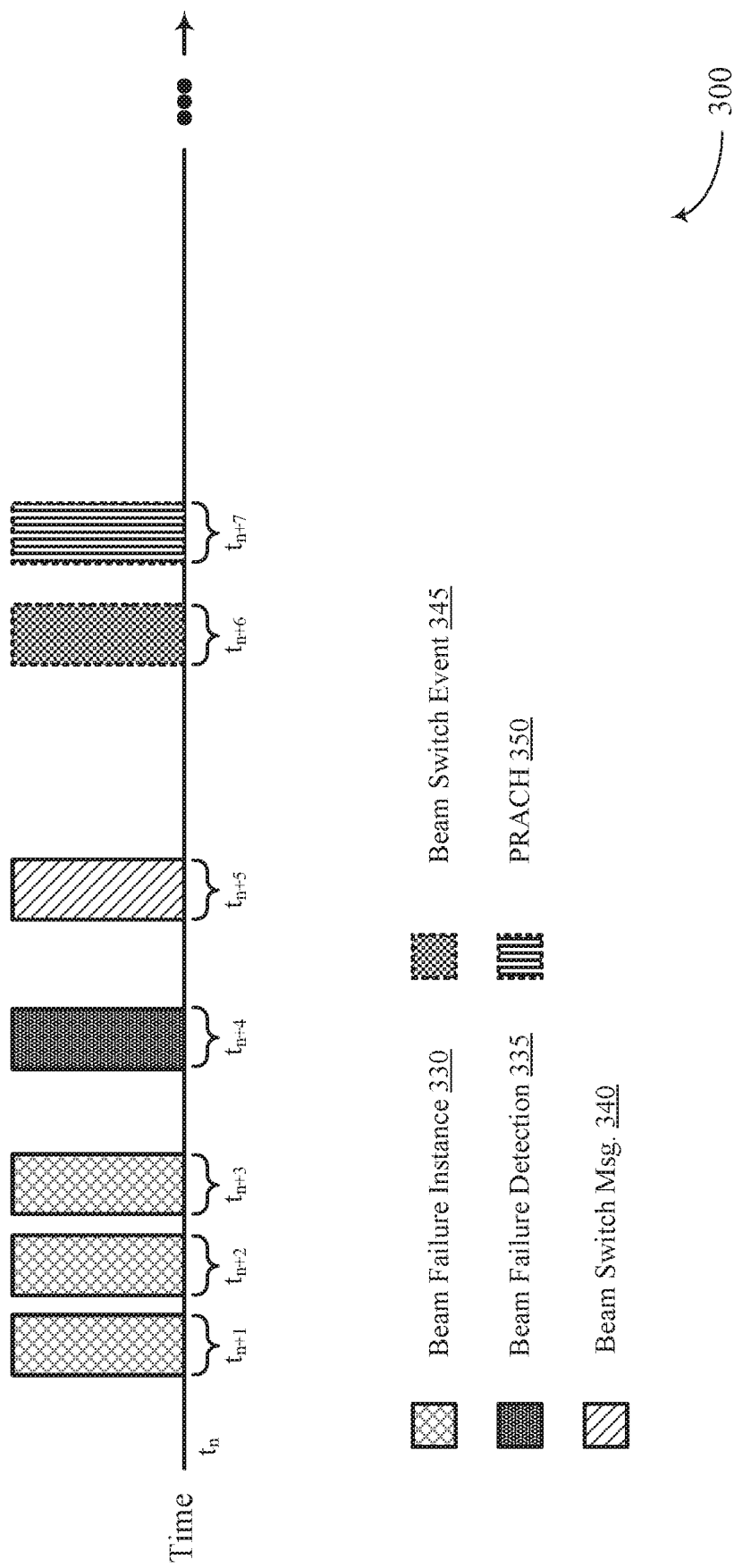
FIGS. 3 and 4 illustrate examples of a timing diagram that supports beam switch and beam failure recovery in accordance with aspects of the present disclosure.

FIG. 3 illustrates an example of a timing diagram 300 that supports beam switch and beam failure recovery in accordance with various aspects of the present disclosure. In some examples, the timing diagram 300 may implement aspects of the wireless communications system 100 and 200. The timing diagram 300 may support selection and prioritization between a beam management procedure such as, a beam switch procedure and a beam failure recovery procedure, to improve communication range, a signal quality, or a spectral efficiency, and reduce overhead and latency in the wireless communications system 100 and 200. In some cases, the UE 215 may prioritize between a beam switch procedure and a beam failure recovery procedure based on timing information or signal quality information, or both.

The UE 215 may detect a beam failure event associated with an active beam (e.g., communication beam 220-*l*) for communicating with the base station 205. In some examples, the UE 215 may detect multiple beam failure instances. For example, the UE 215 may detect beam failure instances 330 occurring at $t_{n+1}$, $t_{n+2}$, and $t_{n+3}$, where n is an integer. The UE 215 may determine a beam failure instance based on monitoring one or more reference signals (e.g., a synchronization signal block (SSB) reference signal, or a physical broadcast channel (PBCH) block reference signal, or a channel state information (CSI) reference signal, or a sounding reference signal (SRS), or a beam reference signal (BRS), or a beam refinement reference signal (BRRS), or a tracking reference signal (TRS)) associated with the active beam, and compare the reference signal to a threshold. The threshold may include a reference received signal power (RSRP), a reference signal received quality (RSRQ), or a block error rate (BLER), or a combination thereof. For example, the UE 215 may determine a beam failure instance based on a BLER of a CSI reference signal being above a threshold. The UE 215 may transmit a transmission 230-*b* reporting a beam failure instance to the base station 205 via communication beam 220-*l*.

In some cases, the UE 215 may increment a beam failure counter based on each of the detected beam failure instances 330. Prior to determining that a beam failure event has occurred, the UE 215 may determine whether the beam failure counter meets a maximum beam failure threshold (e.g., M number of beam failure instances, where M is a positive integer). If the beam failure counter does not meet the maximum beam failure threshold, the UE 215 may continue to operate using the active beam. Otherwise, if the beam failure counter meets the maximum beam failure threshold, the UE 215 may determine at $t_{n+4}$ that a beam failure event 335 has occurred, and trigger a beam failure recovery procedure.

The UE 215 may receive, from the base station 205, a beam switch message 340 at $t_{n+5}$. The beam switch message 340 may include beam switch timing information (e.g., time and frequency resources, symbol index, or a timer period) and a request for the UE 215 to perform a beam switch procedure, during a beam switch event 345 at $t_{n+6}$, based on the beam switch timing information. The beam switch event 345 may span a period configured by the base station 205, e.g., via RRC signaling. The beam switch timing information may indicate when the beam switch event 345 is scheduled to occur, e.g., during N slots, N symbols, where N is an integer. The beam switch procedure may include the UE 215 switching from communicating with the base station 205 using an active beam to communicating with the base station 205 using a target beam. For example, upon receiving the beam switch message 340, the UE 215 may switch its active beam (e.g., control/data beam) during the beam switch event 345 at a predetermined time. The beam switch timing information may indicate time resources, e.g., a symbol index, when to switch from the active beam to a target beam.

In some cases, the UE 215 may determine a pending PRACH transmission 350 in response to receiving the beam switch message 340. The pending PRACH transmission 350 may be associated with a previous beam failure detection event prior to the beam failure event 335 at $t_{n+4}$. The UE 215 may perform a beam switch procedure when the beam switch event 345 occurs prior to the PRACH transmission 350 at td. In some examples, when the UE 215 receives the beam switch message 340 from the base station 205, while the PRACH transmission 350 for the purpose of a beam failure recovery is pending, the UE 215 may determine whether to ignore or initiate the PRACH transmission 350. As such, the PRACH transmission 350 at $t_{n+7}$ may be optional.

The UE 215 may determine to perform a beam failure recovery procedure instead of a beam switch procedure if the beam switch event 345 is scheduled to occur after the PRACH transmission 350 or at a beginning of a random access response window. The UE 215 may make this determination based on the beam switch timing information. For example, the UE 215 may receive, from the base station 205, a response (e.g., a reference signal) on the target beam before the beam switch event 345, and ignore the pending PRACH transmission 350. Alternatively, the UE 215 may not receive a response on the target beam before the beam switch event 345, and as such may initiate the PRACH transmission 350. For example, the UE 215 may transmit a preamble transmission over a candidate beam identified by the UE 215 to the base station 205 as part of the PRACH transmission 350.

The UE 215 may, additionally or alternatively, determine to initiate the PRACH transmission 350 based on a signal quality of a candidate beam and the target beam. For example, the UE 215 may monitor and measure a quality (e.g., an RSRP, an RSRQ, or a BLER) of a reference signal associated with each of the candidate beam and the target beam. In another example, a candidate beam may carry an NR-SS or a CSI-RS, and the UE 215 may monitor and measure a signal quality of the candidate beam and determine whether the signal quality is higher than a threshold predetermined by the base station 205. In the case that the UE 215 determines a candidate beam satisfies the threshold, the UE 215 may select the candidate beam for communication with the base station 205. For example, the UE 215 may compare a quality of the reference signal associated with the candidate beam to a quality of the reference signal associated with the target beam. If the UE 215 determines that the target beam that is indicated in the beam switch message 340 has a signal quality (e.g., dB) greater than the candidate beam that will be used for the beam failure recovery transmission, the UE 215 may perform a beam switch procedure instead of beam failure recovery procedure. Otherwise, if the UE 215 determines that the candidate beam that will be used for the beam failure recovery transmission has a signal quality (e.g., dB) greater than the target beam indicated in the beam switch message 340, the UE 215 may perform a beam failure recovery procedure. As such, the UE 215 may support prioritization between the beam switch procedure and the beam failure recovery procedure, to improve communication range, a signal quality, or a spectral efficiency, and reduce overhead and latency in the wireless communications system 200.

Figure 4:
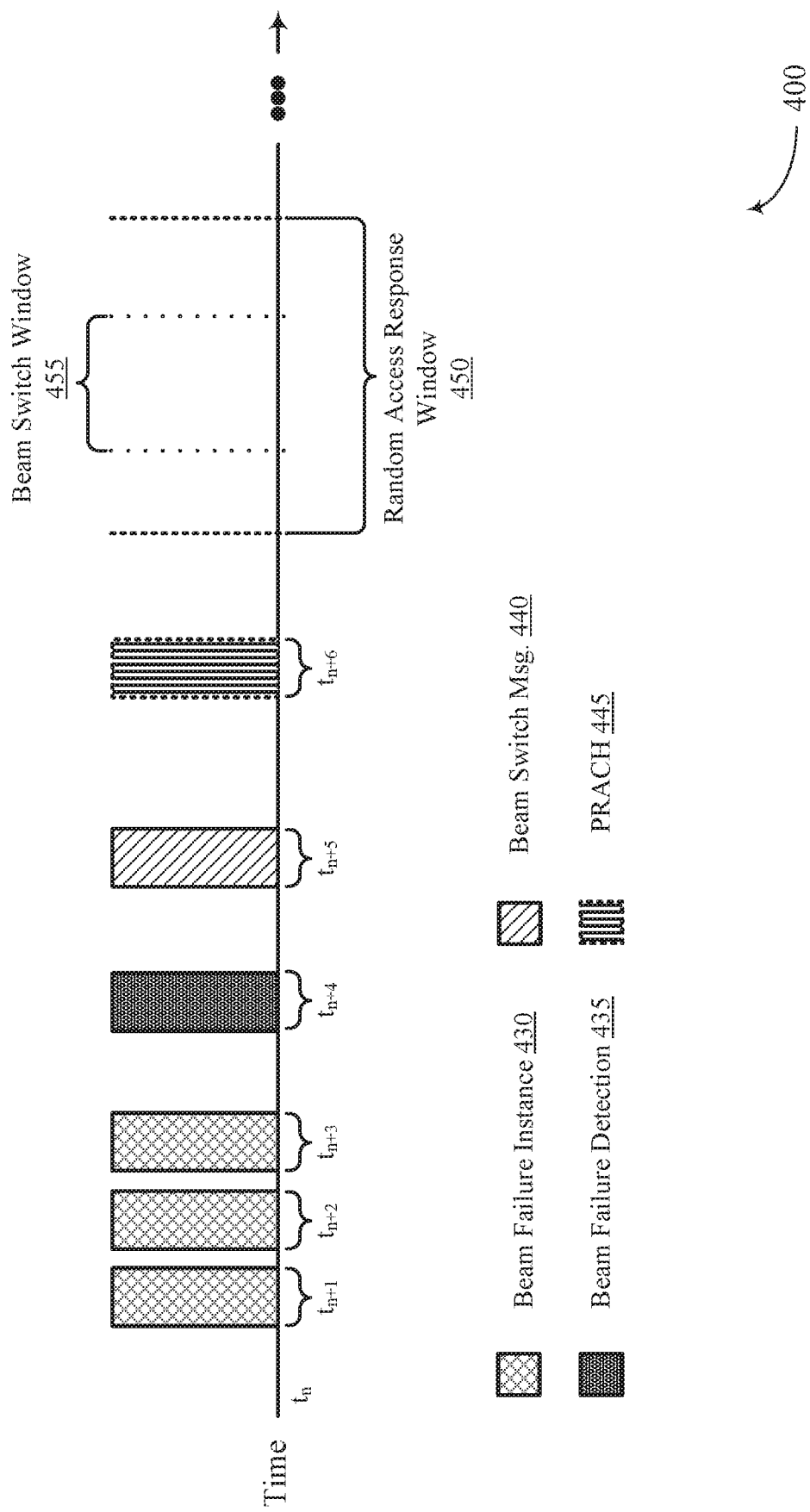

FIG. 4 illustrates an example of a timing diagram 400 that supports beam switch and beam failure recovery in accordance with various aspects of the present disclosure. In some examples, the timing diagram 400 may implement aspects of the wireless communications system 100 and 200. The timing diagram 400 may support prioritization between a beam management procedure such as, a beam switch procedure and a beam failure recovery procedure, to improve communication range, a signal quality, or a spectral efficiency, and reduce overhead and latency in the wireless communications system 100 and 200. In some cases, the UE 215 may prioritize between a beam switch procedure and a beam failure recovery procedure based on timing information or signal quality information, or both.

The UE 215 may detect a beam failure event associated with an active beam (e.g., communication beam 220-$l$) for communicating with the base station 205. In some examples, the UE 215 may detect multiple beam failure instances. For example, the UE 215 may detect beam failure instances 430 occurring at $t_{n+1}$, $t_{n+2}$, and $t_{n+3}$, where n is an integer. The UE 215 may determine a beam failure instance based on monitoring one or more reference signals (e.g., an SSB reference signal, or a PBCH block reference signal, or a CSI reference signal, or an SRS, or a BRS, or a BRRS, or a TRS) associated with the active beam, and compare the reference signal to a threshold. The threshold may include an RSRP, an RSRQ, or a BLER, or a combination thereof. For example, the UE 215 may determine a beam failure instance based on a BLER of a CSI reference signal being above a threshold. The UE 215 may transmit a transmission 230-$b$ reporting a beam failure instance to the base station 205 via communication beam 220-$l$.

In some cases, the UE 215 may increment a beam failure counter based on each of the detected beam failure instances 430. Prior to determining that a beam failure event has occurred, the UE 215 may determine whether the beam failure counter meets a maximum beam failure threshold (e.g., M number of beam failure instances, where A is a positive integer). If the beam failure counter does not meet the maximum beam failure threshold, the UE 215 may continue to operate using the active beam. Otherwise, if the beam failure counter meets the maximum beam failure threshold, the UE 215 may determine at $t_{n+4}$ that a beam failure event 435 has occurred, and trigger a beam failure recovery procedure.

The UE 215 may receive, from the base station 205, a beam switch message 440 at $t_{n+5}$. The beam switch message 440 may include beam switch timing information (e.g., time and frequency resources, symbol index, etc.) and a request for the UE 215 to perform a beam switch procedure, during a beam switch window 455, based on the beam switch timing information. The beam switch window 455 may indicate a time interval when a beam switch event is scheduled to occur, e.g., during N slots, N symbols, where N is an integer. The beam switch procedure may include the UE 215 switching from communicating with the base station 205 using an active beam to communicating with the base station 205 using a target beam. The UE 215 may initiate a PRACH transmission 445 at $t_{n+6}$ based on the received beam switch message 440 at $t_{n+5}$. In some cases, UE 215 may transmit a preamble transmission over a candidate beam as part of the PRACH transmission 445. In some cases, a random access response window 450 may occur, e.g., during N slots, N symbols after the PRACH transmission 445, where N is an integer. In some examples, the beam switch window 455 may occur within the random access response window 450.

The base station 205 may schedule and allocate resources to the UE 215 for a transmission via a beamformed transmission (e.g., beamformed communication beam 220-$a$). For example, the base station 205 may schedule and allocate resources for a downlink transmission of control information. The base station 205 may, in some cases, configure a control resource set (CORESET) and search space for transmission of control information (e.g., downlink control information (DCI)) to the UE 215 on a physical control channel (PDCCH). A search space may refer to a CORESET. A search space may refer to any resources (e.g., time and frequency resources such as groups of resource elements, resource element groups, etc.) used for control information transmission within a given slot (e.g., a TTI, an s-TTI). As part of the transmission of control information (e.g., DCI) to the UE 215 from base station 205, UE 215 monitors a search space for control information (e.g., on the physical control channel (PDCCH)) from the base station 205, for example including after initiating the PRACH transmission 445 at $t_{n+6}$. In some examples, UE 210 may monitor such search space prior to transmitting the PRACH transmission 445, and continue to monitor such search space following PRACH transmission 445. In some cases, UE 210 may also monitor the search space during all or a portion of the random access response window 450.

The UE 215 may monitor beam failure recovery control channel elements (CCEs) of a CORESET for a response (e.g., a random access response) to PRACH transmission 445 from the base station 205 using the candidate beam, during the random access response window 450 (e.g., monitor the beam failure recovery CCEs as another search space of the CORESET). In some cases, the UE 215 may identify a beam switch event associated with the beam switch window 455 occurring within the random access response window 450 based on beam switch timing information indicated in the beam switch message 440.

The UE 215 may perform a beam switch procedure based on an absence of a response from the base station 205, for example during a portion of the random access response window 450 and prior to the beam switch window 455. Alternatively, the UE 215 may receive, from the base station 205, the response via the candidate beam prior to the beam switch event and ignore the beam switch procedure.

In some cases, the UE 215 may receive, from the base station 205, the response via the candidate beam, prior to the beginning of the beam switch event, and measure a quality of a reference signal associated with the candidate beam. The UE 215 may compare the quality of the reference signal associated with the candidate beam to a threshold, and perform the beam switch procedure during the beam switch window 455 based on the quality of the reference signal associated with the candidate beam satisfying the threshold.

In some cases, the UE 215 may monitor for the response, from the base station 205, during the beam switch window 455 via a target beam indicated in the beam switch message 440 using a number of different beam failure recovery CCEs. In some cases, the UE 215 may receive, from the base station 205, a response via the target beam, prior to a time period of the beam switch event lapsing. In this case, the UE 215 may abandon monitoring a remainder portion of the random access response window 450 (e.g., a RACH procedure, a beam failure recovery, etc.). The time period maybe configured by RRC signaling or predetermined. In some cases, the UE 215 may receive and measure a quality of the reference signal associated with the target beam, and compare the quality of the reference signal associated with the target beam to a threshold. The UE 215 may suspend the random access response window 450 based on the quality of the reference signal associated with the target beam being above the threshold. In some examples, a physical layer of the UE 215 may transmit an indication to an upper layer (e.g., layer 2 or layer 3) for receiving a response from the base station 205 and to suspend the RACH procedure. Alternatively, the UE 215 may determine that the quality of the reference signal associated with the target beam is below the threshold, and the beam switch window 455 has lapsed. As a result, the UE 215 continue monitoring the beam failure recovery CCEs for the response from the base station 205 during a second portion of the random access response window 450 using the candidate beam. The second portion may occur after the beam switch window 455.

As such, if the beam switch event occurs within the random access response window 450, the UE 215 may monitor beam failure recovery CCEs (e.g., CORESETs) during the random access response window 450. In addition, at a beam switch time (e.g., system frame number (SFN), symbol frame indicator (SFI), slot, symbol, etc.) and for a beam switch window 455 (e.g., window of Y, where Y is time unit (e.g., ms, s, symbols, slots, etc.)), the UE 215 may monitor for a response on a target beam (e.g., TCI (CORE-SETs)) specified in the beam switch message 440. As a result, the UE 215 may support prioritization between the beam switch procedure and the beam failure recovery procedure, to improve communication range, a signal quality, or a spectral efficiency, and reduce overhead and latency in the wireless communications system 200.

Figure 5:
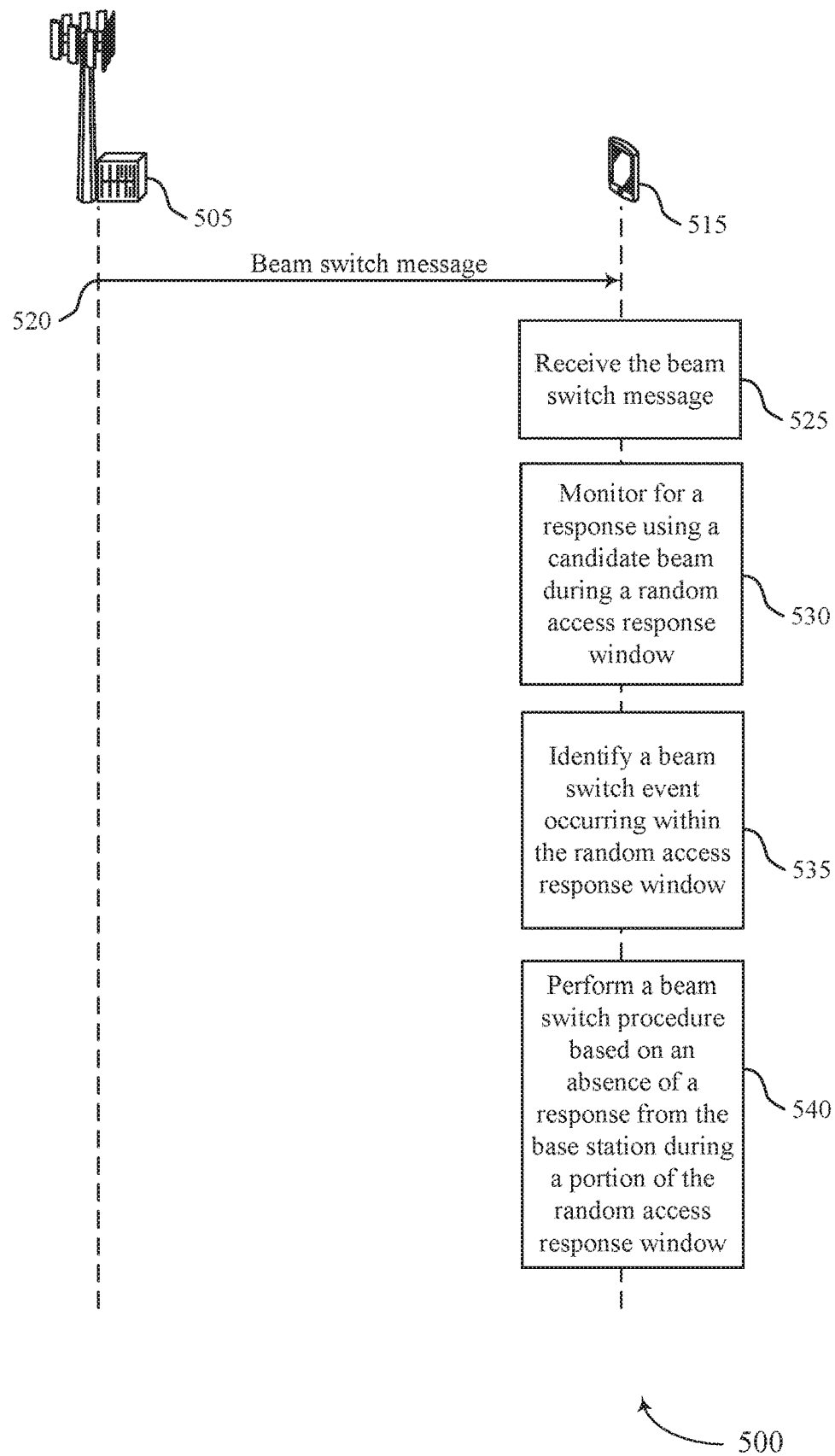
FIGS. 5 and 6 illustrate examples of a process flow that supports beam switch and beam failure recovery in accordance with aspects of the present disclosure.

FIG. 5 illustrates an example of a process flow 500 that supports beam switch and beam failure recovery in accordance with various aspects of the present disclosure. In some examples, the process flow 500 may implement aspects of wireless communications system 100 and 200. Base station 505 and UE 515 may be examples of the corresponding devices described with reference to FIGS. 1 and 2.

In the following description of the process flow 500, the operations between the base station 505 and the UE 515 may be transmitted in a different order than the exemplary order shown, or the operations performed by the base station 505 and the UE 515 may be performed in different orders or at different times. Some operations may also be left out of the process flow 500, or other operations may be added to the process flow 500.

In some examples, the process flow 500 may commence with the base station 505 establishing a connection with the UE 515 (e.g., performing a cell acquisition procedure, a random access procedure, an RRC connection procedure, an RRC configuration procedure, etc.).

At 520, the base station 505 may transmit a beam switch message to the UE 515. At 525, the UE 515 may receive the beam switch message from the base station 505. The beam switch message may include beam switch timing information and a request for the UE 515 to perform a beam switch procedure, during a beam switch event based at least in part on the beam switch timing information.

At 530, the UE 515 may monitor for a response, from the base station 505, using a candidate beam during a random access response window.

At 535, the UE 515 may identify a beam switch event occurring within the random access response window. For example, the UE 515 identify the beam switch event occurring with the random access response window based on beam switch timing information indicated in the beam switch message.

At 540, the UE 515 may perform a beam switch procedure based on an absence of a response from the base station 505 during a portion of the random access response window. For example, the UE 515 may perform a beam switch procedure based at least in part on an absence of a response from the base station 505 during a portion of the random access response window and prior to a beginning of the beam switch event.

Figure 6:
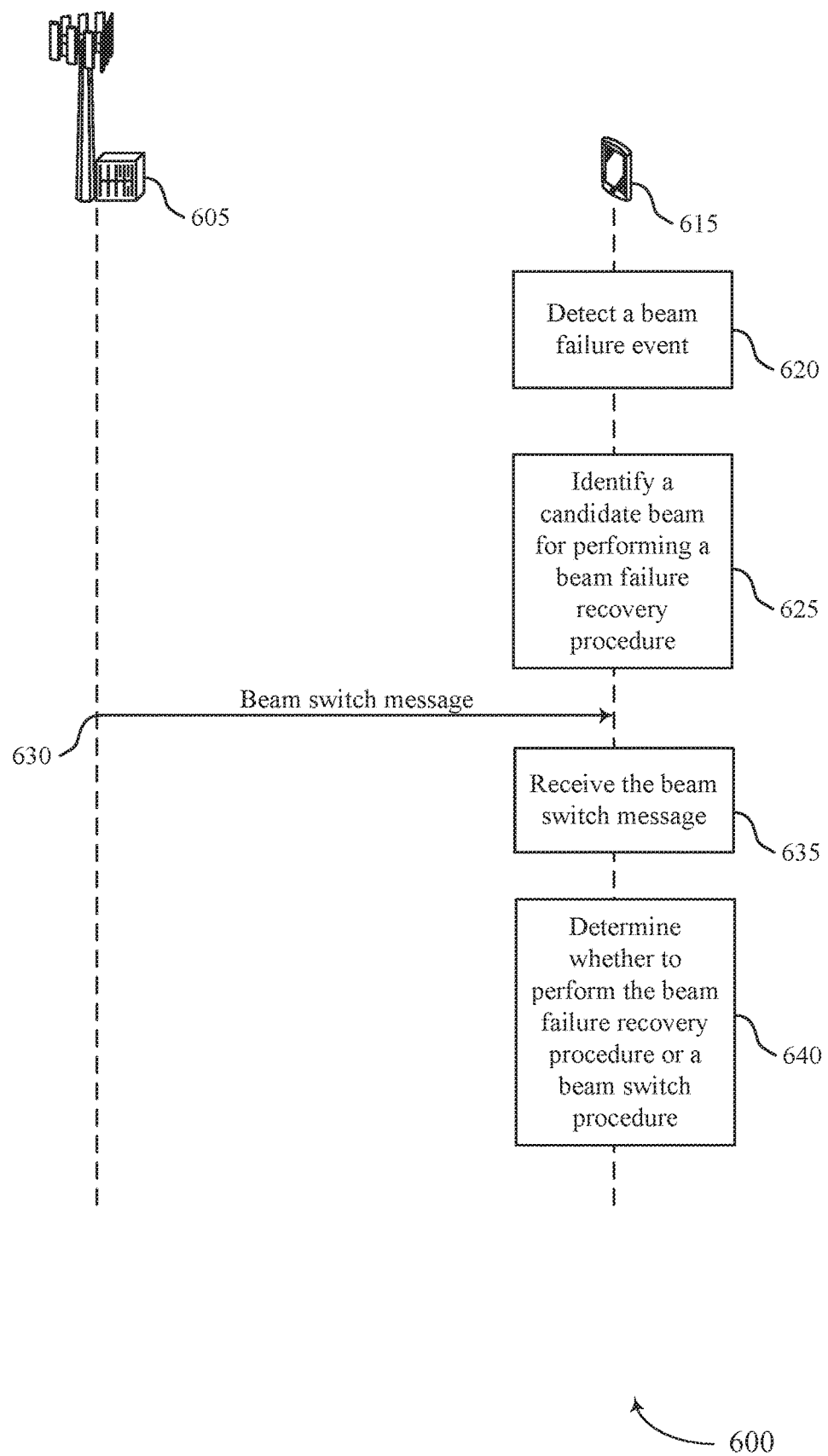

FIG. 6 illustrates an example of a process flow 600 that supports beam switch and beam failure recovery in accordance with various aspects of the present disclosure. In some examples, the process flow 600 may implement aspects of wireless communications system 100 and 200. Base station 605 and UE 615 may be examples of the corresponding devices described with reference to FIGS. 1 and 2.

In the following description of the process flow 600, the operations between the base station 605 and the UE 615 may be transmitted in a different order than the exemplary order shown, or the operations performed by the base station 605 and the UE 615 may be performed in different orders or at different times. Some operations may also be left out of the process flow 600, or other operations may be added to the process flow 600.

In some examples, the process flow 600 may commence with the base station 605 establishing a connection with the UE 615 (e.g., performing a cell acquisition procedure, a random access procedure, an RRC connection procedure, an RRC configuration procedure, etc.).

At 620, the UE 615 may detect a beam failure event. For example, the UE 615 may detect a beam failure event associated with an active beam for communicating with the base station 605. In some examples, the UE 615 may detect a beam failure instance associated with the active beam, and increment a beam failure counter based at least in part on the detected beam failure instance. The UE 615 may determine whether the beam failure counter meets a maximum beam failure threshold, where determining the beam failure event is based at least in part on the beam failure counter meeting the maximum beam failure threshold.

At 625, the UE 615 may identify a candidate beam for performing a beam failure recovery procedure. For example, the UE 615 may identify the candidate beam based on the determined beam failure event.

At 630, the base station 605 may transmit a beam switch message to the UE 615. At 635, the UE 615 may receive the beam switch message from the base station 605. The beam switch message may include beam switch timing information and a request for the UE 615 to perform a beam switch procedure, during a beam switch event based on the beam switch timing information.

At 640, the UE 615 may determine whether to perform the beam failure recovery procedure or a beam switch procedure. For example, the UE 615 may determine whether to perform the beam failure recovery procedure or a beam switch procedure, in response to receiving the beam switch message after detecting the beam failure event. In some examples, the determination may be based on a signal quality associated with the candidate beam and the target beam.

Figure 7:
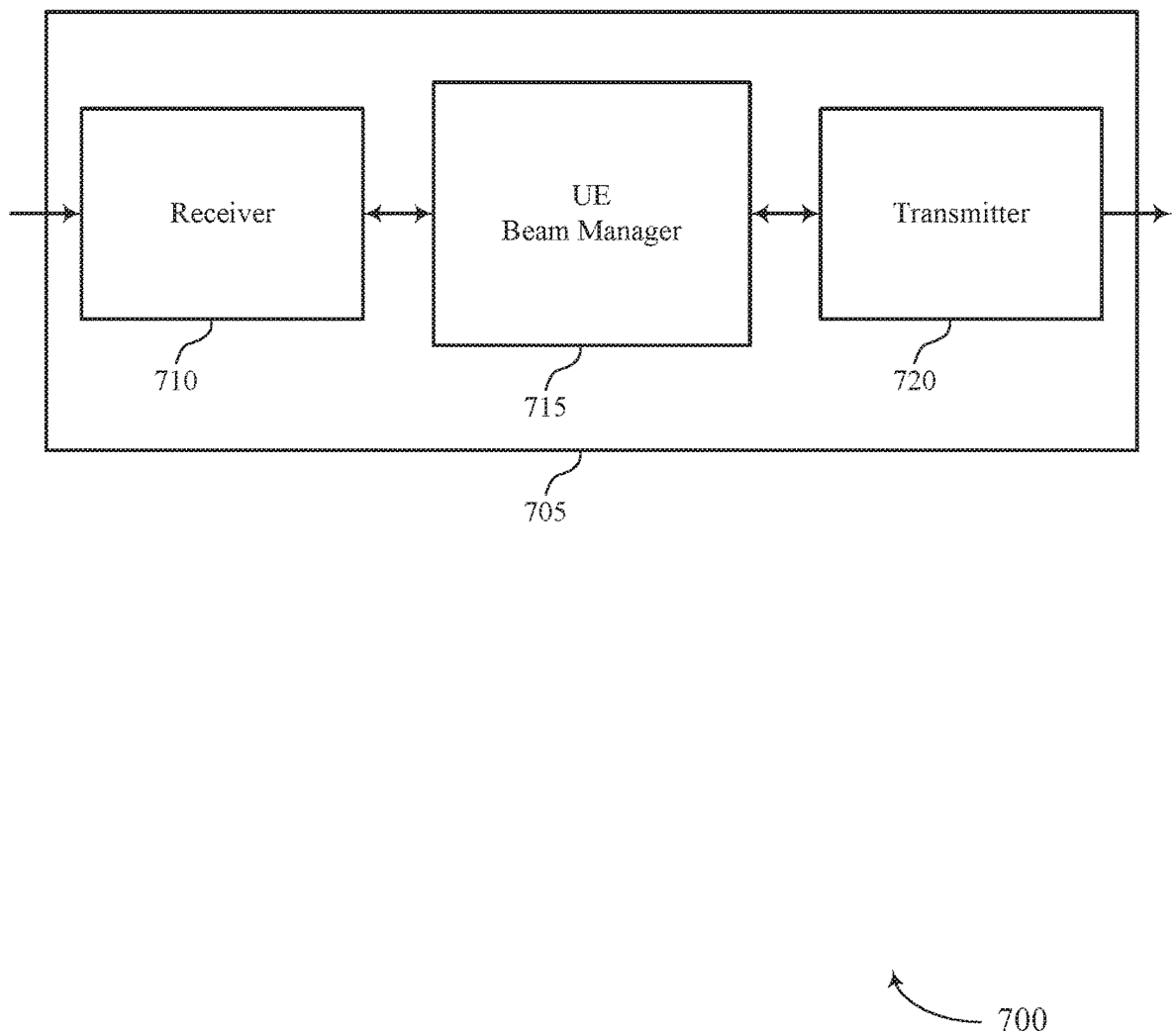
FIGS. 7 through 9 show block diagrams of a device that supports beam switch and beam failure recovery in accordance with aspects of the present disclosure.

FIG. 7 shows a block diagram 700 of a wireless device 705 that supports beam switch and beam failure recovery in accordance with aspects of the present disclosure. Wireless device 705 may be an example of aspects of a user equipment (UE) 115 as described herein. Wireless device 705 may include receiver 710, UE beam manager 715, and transmitter 720. Wireless device 705 may also include one or more processors, memory coupled with the one or more processors, and instructions stored in the memory are executable by the one or more processors to enable the one or more processors to perform one or more operations of UE beam manager 715 as discussed herein. Each of these components may be in communication with one another (e.g., via one or more buses).

Receiver 710 may receive information such as packets, user data, or control information associated with various information channels (e.g., control channels, data channels, and information related to beam switch and beam failure recovery, etc.). Information may be passed on to other components of the wireless device 705. The receiver 710 may be an example of aspects of the transceiver 1035 described with reference to FIG. 10. The receiver 710 may utilize a single antenna or a set of antennas.

Receiver 710 may receive a beam switch message prior to initiating a PRACH procedure. Receiver 710 may receive, from a base station 105, a response via a candidate beam prior to a beam switch event. Receiver 710 may receive, from the base station 105, the response via the candidate beam, prior to the beam switch event. Receiver 710 may receive, from the base station 105, the response via the target beam, prior to a time period associated with the beam switch event lapsing. Receiver 710 may receive, from the base station 105 after detecting a beam failure event, a beam switch message requesting the UE 115 to perform a beam switch procedure, where the beam switch procedure includes the UE 115 switching from communicating with the base station 105 using the active beam to communicating with the base station 105 using a target beam. Receiver 710 may receive, from the base station 105, the response on the target beam after the beam switch event, and receive, from the base station 105, the response on the target beam before the beam switch event.

UE beam manager 715 may be an example of aspects of the UE beam manager 1015 described with reference to FIG. 10. UE beam manager 715 and/or at least some of its various sub-components may be implemented in hardware, software executed by a processor, firmware, or any combination thereof. If implemented in software executed by a processor, the functions of the UE beam manager 715 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. In some cases, UE beam manager 715 may be a processor (e.g., a transceiver processor, or a radio processor, or a receiver processor). The processor may be coupled with memory and execute instructions stored in the memory that enable the processor to perform or facilitate the communication pattern identification features discussed herein. A transceiver processor may be collocated with and/or communicate with (e.g., direct the operations of) a transceiver of the wireless device 705. A radio processor may be collocated with and/or communicate with (e.g., direct the operations of) a radio (e.g., an LTE radio or a Wi-Fi radio) of the wireless device 705. A receiver processor may be collocated with and/or communicate with (e.g., direct the operations of) a receiver of the wireless device 705.

The UE beam manager 715 and/or at least some of its various sub-components may be physically located at various positions, including being distributed such that portions of functions are implemented at different physical locations by one or more physical devices. In some examples, UE beam manager 715 and/or at least some of its various sub-components may be a separate and distinct component in accordance with various aspects of the present disclosure. In other examples, UE beam manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE beam manager 715 may monitor for a response from a base station 105 using a candidate beam during a random access response window, identify a beam switch event occurring within the random access response window based on beam switch timing information indicated in the beam switch message, and perform a beam switch procedure based on an absence of a response from the base station 105 during a portion of the random access response window and prior to the beam switch event. In some cases, UE beam manager 715 may also monitor, after initiating the physical random access channel (PRACH) procedure, a search space of a control resource set for downlink control information for the UE. In some cases, UE beam manager 715 may monitor at least one control channel element of the control resource set for the response. In some cases, UE beam manager 715 may monitor the search space for the downlink control information prior to initiating the PRACH procedure.

The UE beam manager 715 may also detect a beam failure event associated with an active beam for communicating with a base station, identify a candidate beam for performing a beam failure recovery procedure based on the determined beam failure event, and determine to perform the beam failure recovery procedure or the beam switch procedure in response to receiving the beam switch message after detecting the beam failure event, the determination based on a signal quality associated with the candidate beam and the target beam. The UE beam manager 715 may also determine to initiate a PRACH transmission based on the beam switch timing information and receiving, from the base station, a response on the target beam. In some cases, UE beam manager 715 may also detect a beam failure instance associated with an active beam, increment a beam failure counter based at least in part on the detected beam failure instance, determine whether the beam failure counter meets a maximum beam failure threshold, determine a beam failure event based at least in part on the beam failure counter meeting the maximum beam failure threshold, and trigger a beam failure recovery procedure based at least in part on the determined beam failure event.

Transmitter 720 may transmit signals generated by other components of the wireless device 705. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas. Transmitter 720 may transmit, to the base station, a PRACH requesting the beam failure recovery procedure on the candidate beam and transmit the pending PRACH transmission based on the quality of the reference signal being below the threshold.

Figure 8:
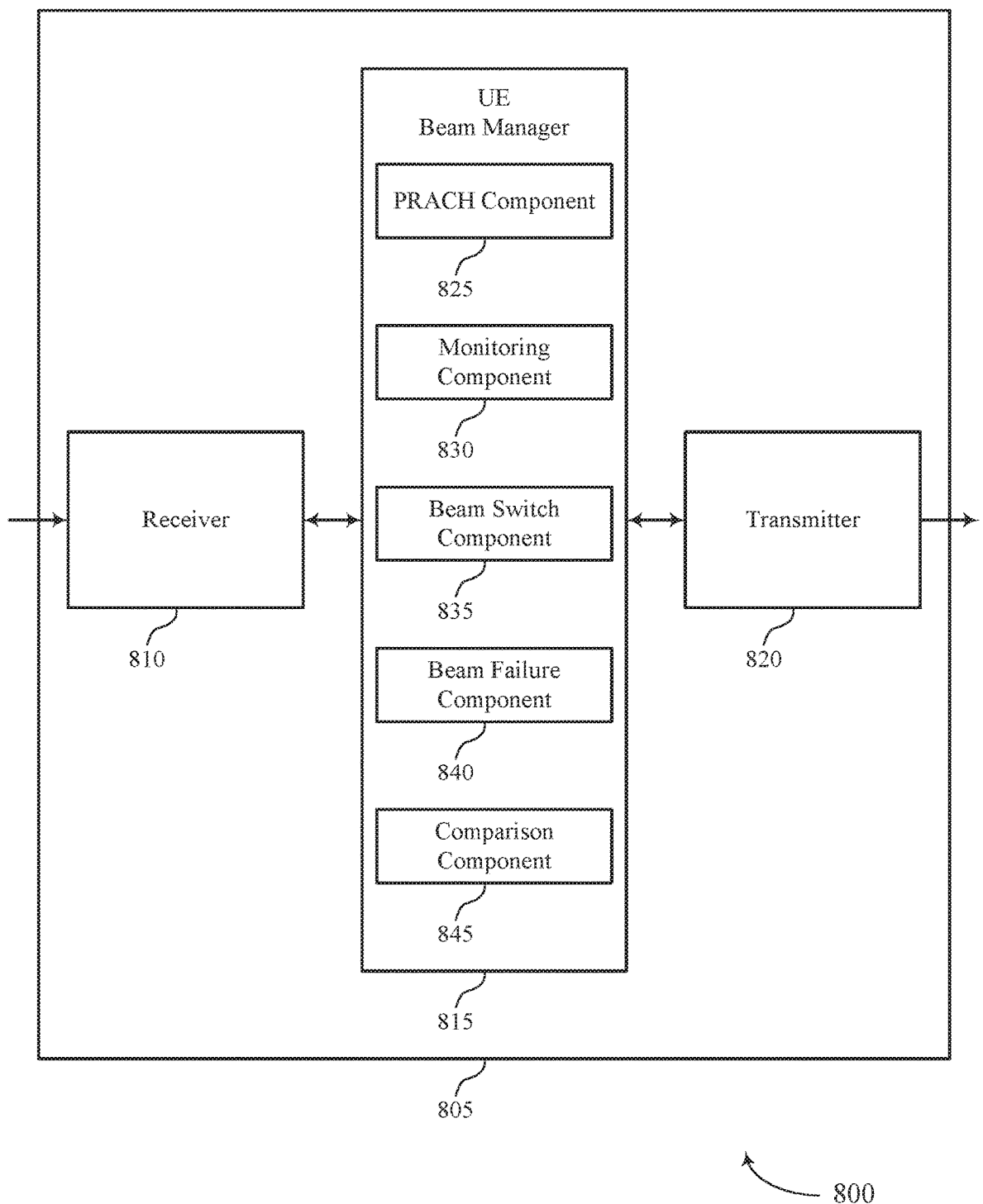

FIG. 8 shows a block diagram 800 of a wireless device 805 that supports beam switch and beam failure recovery in accordance with aspects of the present disclosure. Wireless device 805 may be an example of aspects of a wireless device 705 or a UE 115 as described with reference to FIG. 7. Wireless device 805 may include receiver 810, UE beam manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to beam switch and beam failure recovery, etc.). Information may be passed on to other components of the wireless device 805. The receiver 810 may be an example of aspects of the transceiver 1035 described with reference to FIG. 10. The receiver 810 may utilize a single antenna or a set of antennas.

UE beam manager 815 may be an example of aspects of the UE beam manager 1015 described with reference to FIG. 10. UE beam manager 815 may also include PRACH component 825, monitoring component 830, beam switch component 835, beam failure component 840, and comparison component 845. In some cases, UE beam manager 815 may be a processor (e.g., a transceiver processor, or a radio processor, or a receiver processor). The processor may be coupled with memory and execute instructions stored in the memory that enable the processor to perform or facilitate the communication pattern identification features discussed herein. A transceiver processor may be collocated with and/or communicate with (e.g., direct the operations of) a transceiver of the wireless device 805. A radio processor may be collocated with and/or communicate with (e.g., direct the operations of) a radio (e.g., an LTE radio or a Wi-Fi radio) of the wireless device 805. A receiver processor may be collocated with and/or communicate with (e.g., direct the operations of) a receiver of the wireless device 805.

PRACH component 825 may trigger the PRACH procedure based on a beam failure event. PRACH component 825 may determine to initiate a PRACH transmission based on the beam switch timing information and receiving, from the base station, a response on the target beam. PRACH component 825 may determine there is a pending PRACH transmission based on receiving the beam switch message, and ignore the pending PRACH transmission based on receiving the response before the beam switch event. PRACH component 825 may initiate the PRACH transmission based on receiving the response before the beam switch event. In some cases, PRACH component 825 may be a processor (e.g., a transceiver processor, or a radio processor, or a receiver processor). The processor may be coupled with memory and execute instructions stored in the memory that enable the processor to perform or facilitate the features discussed herein.

Monitoring component 830 may monitor for a response from a base station 105 using a candidate beam during a random access response window. Monitoring component 830 may monitor for a response via a target beam indicated in the beam switch message, from the base station, during a time period associated with the beam switch event. In some cases, monitoring component 830 may also monitor, after initiating the physical random access channel (PRACH) procedure, a search space of a control resource set for downlink control information for the UE 115. In some cases, monitoring component 830 may monitor at least one control channel element of the control resource set for the response. In some cases, monitoring component 830 may monitor the search space for the downlink control information prior to initiating the PRACH procedure.

Monitoring component 830 may continue monitoring for the response from the base station 105 during a remainder portion of the random access response window using the candidate beam. Monitoring component 830 may monitor a reference signal associated with the active beam, where the active beam corresponds to a PDCCH control beam. Monitoring component 830 may monitor a reference signal associated with the target beam, where the response includes the reference signal, and monitor a reference signal associated with the active beam, where the response includes the reference signal. In some cases, the reference signal includes an SSB reference signal, or a PBCH block reference signal, or a CSI reference signal, or an SRS, or a BRS, or a BRRS, or a TRS, or a combination thereof. In some cases, the threshold includes an RSRP, an RSRQ, or a BLER, or a combination thereof. In some cases, monitoring component 830 may be a processor (e.g., a transceiver processor, or a radio processor, or a receiver processor). The processor may be coupled with memory and execute instructions stored in the memory that enable the processor to perform or facilitate the features discussed herein.

Beam switch component 835 may identify a beam switch event occurring within the random access response window based on beam switch timing information indicated in the beam switch message. Beam switch component 835 may perform a beam switch procedure based on an absence of a response from the base station 105 during a portion of the random access response window and prior to the beam switch event. Beam switch component 835 may ignore the beam switch event based on receiving the response prior to the beam switch event. Beam switch component 835 may perform the beam switch procedure based on the quality of the reference signal associated with the candidate beam satisfying the threshold. Beam switch component 835 may determine that the beam switch event has lapsed.

Beam switch component 835 may perform the beam switch procedure based on the quality of the reference signal associated with the target beam being above a threshold compared to the quality of the reference signal associated with the candidate beam, where the threshold is preconfigured by the base station 105. Beam switch component 835 may perform the beam switch procedure based on the beam switch message being carried over a PDCCH. Beam switch component 835 may perform the beam switch procedure during the beam switch event, and determine that the beam switch event is scheduled to occur after the PRACH transmission or a random access response window based on the beam switch timing information, where triggering the beam failure recovery procedure is based on the beam switch event being scheduled to occur after the PRACH transmission or the random access response window. In some cases, beam switch component 835 may be a processor (e.g., a transceiver processor, or a radio processor, or a receiver processor). The processor may be coupled with memory and execute instructions stored in the memory that enable the processor to perform or facilitate the features discussed herein.

Beam failure component 840 may detect a beam failure event associated with an active beam for communicating with a base station. Beam failure component 840 may trigger a beam failure recovery procedure based on the determined beam failure event. Beam failure component 840 may trigger the PRACH procedure based on the beam failure event. Beam failure component 840 may perform the beam failure recovery procedure based on the quality of the reference signal associated with the candidate beam being above a threshold compared to the quality of the reference signal associated with the target beam, where the threshold is preconfigured by the base station 105.

Beam failure component 840 may detect a beam failure instance associated with the active beam, increment a beam failure counter based on the detected beam failure instance, and determine whether the beam failure counter meets a maximum beam failure threshold, where determining the beam failure event is based on the beam failure counter meeting the maximum beam failure threshold. Beam failure component 840 may identify a candidate beam for performing a beam failure recovery procedure based on the determined beam failure event, perform a beam failure recovery procedure based on the transmitting, determine whether the beam failure counter meets a maximum beam failure threshold, determine a beam failure event based on the beam failure counter meeting the maximum beam failure threshold, and trigger the beam failure recovery procedure based on the determined beam failure event. In some cases, beam failure component 840 may be a processor (e.g., a transceiver processor, or a radio processor, or a receiver processor). The processor may be coupled with memory and execute instructions stored in the memory that enable the processor to perform or facilitate the features discussed herein.

Comparison component 845 may compare the quality of the reference signal associated with the candidate beam to a threshold. Comparison component 845 may compare the quality of the reference signal associated with the target beam to the threshold. Comparison component 845 may determine that the quality of the reference signal associated with the target beam is below the threshold, and determine to perform the beam failure recovery procedure or the beam switch procedure in response to receiving the beam switch message after detecting the beam failure event, the determination based on a signal quality associated with the candidate beam and the target beam. Comparison component 845 may compare a quality of the reference signal associated with the candidate beam to a quality of the reference signal associated with the target beam, where determining to perform the beam failure recovery procedure or the beam switch procedure is based on the comparing. Comparison component 845 may compare the reference signal to the threshold, where detecting the beam failure instance is based on the reference signal satisfying the threshold. In some cases, comparison component 845 may be a processor (e.g., a transceiver processor, or a radio processor, or a receiver processor). The processor may be coupled with memory and execute instructions stored in the memory that enable the processor to perform or facilitate the features discussed herein.

Transmitter 820 may transmit signals generated by other components of the wireless device 805. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
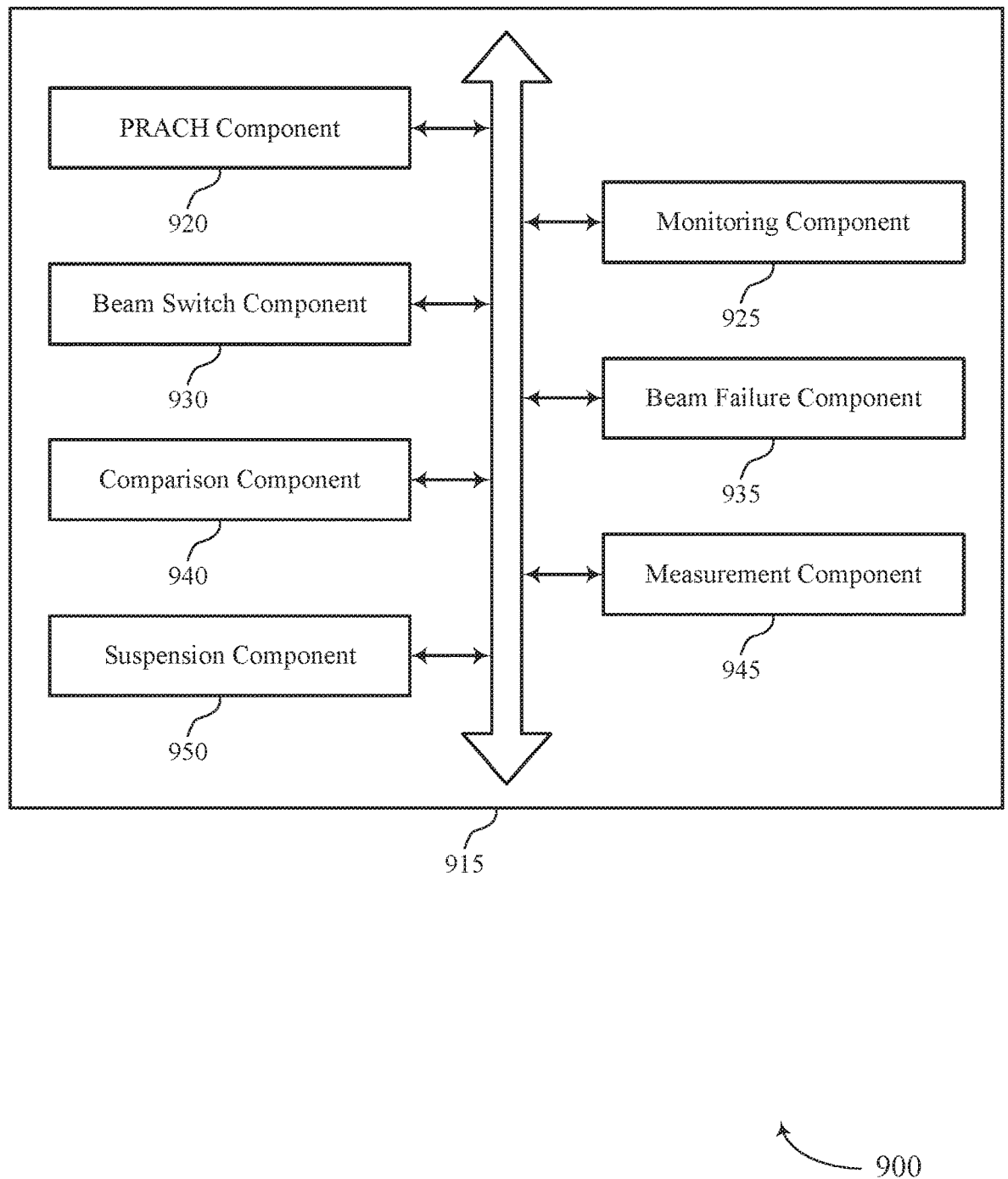

FIG. 9 shows a block diagram 900 of a UE beam manager 915 that supports beam switch and beam failure recovery in accordance with aspects of the present disclosure. The UE beam manager 915 may be an example of aspects of a UE beam manager 715, a UE beam manager 815, or a UE beam manager 1015 described with reference to FIGS. 7, 8, and 10. The UE beam manager 915 may include PRACH component 920, monitoring component 925, beam switch component 930, beam failure component 935, comparison component 940, measurement component 945, and suspension component 950. Each of these modules may communicate, directly or indirectly, with one another (e.g., via one or more buses). In some cases, UE beam manager 915 may be a processor. (e.g., a transceiver processor, or a radio processor, or a receiver processor). The processor may be coupled with memory and execute instructions stored in the memory that enable the processor to perform or facilitate the communication pattern identification features discussed herein. A transceiver processor may be collocated with and/or communicate with (e.g., direct the operations of) a transceiver of the device. A radio processor may be collocated with and/or communicate with (e.g., direct the operations of) a radio (e.g., an LTE radio or a Wi-Fi radio) of the device. A receiver processor may be collocated with and/or communicate with (e.g., direct the operations of) a receiver of the device.

PRACH component 920 may trigger a PRACH procedure based on message beam failure event. PRACH component 920 may determine to initiate a PRACH transmission based on beam switch timing information and receiving, from a base station, a response on a target beam. PRACH component 920 may determine a pending PRACH transmission based on receiving the beam switch message. PRACH component 920 may ignore the pending PRACH transmission based on receiving the response before a beam switch event, and initiate the PRACH transmission based on receiving the response before the beam switch event. In some cases, PRACH component 920 may be a processor (e.g., a transceiver processor, or a radio processor, or a receiver processor). The processor may be coupled with memory and execute instructions stored in the memory that enable the processor to perform or facilitate the features discussed herein.

Monitoring component 925 may monitor for a response from a base station 105 using a candidate beam during a random access response window. Monitoring component 925 may monitor for a response via a target beam indicated in the beam switch message, from the base station, during a time period associated with the bam switch event. Monitoring component 925 may continue monitoring for the response from the base station 105 during a remainder portion of the random access response window using the candidate beam.

Monitoring component 925 may monitor a reference signal associated with the active beam. The active beam may correspond to a PDCCH control beam. Monitoring component 925 may monitor a reference signal associated with the target beam. The response includes the reference signal. Monitoring component 925 may monitor the reference signal associated with the active beam. In some cases, the reference signal includes an SSB reference signal, or a PBCH block reference signal, or a CSI reference signal, or an SRS, or a BRS, or a BRRS, or a TRS, or a combination thereof. In some cases, the threshold includes an RSRP, an RSRQ, or a BLER, or a combination thereof. In some cases, monitoring component 925 may be a processor (e.g., a transceiver processor, or a radio processor, or a receiver processor). The processor may be coupled with memory and execute instructions stored in the memory that enable the processor to perform or facilitate the features discussed herein.

Beam switch component 930 may identify a beam switch event occurring within the random access response window based on beam switch timing information indicated in the beam switch message. Beam switch component 930 may perform a beam switch procedure based on an absence of a response from the base station 105 during a portion of the random access response window and prior to the beam switch event. Beam switch component 930 may ignore the beam switch event based on receiving the response prior to the beam switch event. Beam switch component 930 may trigger the PRACH procedure based on the beam failure event. Beam switch component 930 may perform the beam switch procedure based on the quality of the reference signal associated with the candidate beam satisfying the threshold. Beam switch component 930 may determine that the beam switch event has lapsed. Beam switch component 930 may perform the beam switch procedure based on the quality of the reference signal associated with the target beam being above a threshold compared to the quality of the reference signal associated with the candidate beam.

The threshold may be preconfigured by the base station. Beam switch component 930 may perform the beam switch procedure based on the beam switch message being carried over a PDCCH, perform the beam switch procedure during the beam switch event, and determine that the beam switch event is scheduled to occur after the PRACH transmission or a random access response window based on the beam switch timing information. In some examples, triggering the beam failure recovery procedure may be based on the beam switch event being scheduled to occur after the PRACH transmission or the random access response window. In some cases, beam switch component 930 may be a processor (e.g., a transceiver processor, or a radio processor, or a receiver processor). The processor may be coupled with memory and execute instructions stored in the memory that enable the processor to perform or facilitate the features discussed herein.

Beam failure component 935 may detect a beam failure event associated with an active beam for communicating with a base station. Beam failure component 935 may trigger a beam failure recovery procedure based on the determined beam failure event. Beam failure component 935 may perform the beam failure recovery procedure based on the quality of the reference signal associated with the candidate beam being above a threshold compared to the quality of the reference signal associated with the target beam. The threshold may be preconfigured by the base station 105. Beam failure component 935 may detect a beam failure instance associated with the active beam, increment a beam failure counter based on the detected beam failure instance, and determine whether the beam failure counter meets a maximum beam failure threshold. In some examples, determining the beam failure event is based on the beam failure counter meeting the maximum beam failure threshold. Beam failure component 935 may identify a candidate beam for performing a beam failure recovery procedure based on the determined beam failure event. Beam failure component 935 may perform a beam failure recovery procedure based on the transmitting, determine whether the beam failure counter meets a maximum beam failure threshold, determine a beam failure event based on the beam failure counter meeting the maximum beam failure threshold, and trigger the beam failure recovery procedure based on the determined beam failure event. In some cases, beam failure component 935 may be a processor (e.g., a transceiver processor, or a radio processor, or a receiver processor). The processor may be coupled with memory and execute instructions stored in the memory that enable the processor to perform or facilitate the features discussed herein.

Comparison component 940 may compare the quality of the reference signal associated with the candidate beam to the threshold. Comparison component 940 may compare the quality of the reference signal associated with the target beam to the threshold. Comparison component 940 may determine that the quality of the reference signal associated with the target beam is below the threshold. Comparison component 940 may determine to perform the beam failure recovery procedure or the beam switch procedure in response to receiving the beam switch message after detecting the beam failure event, the determination based on a signal quality associated with the candidate beam and the target beam.

Comparison component 940 may compare a quality of the reference signal associated with the candidate beam to a quality of the reference signal associated with the target beam, where determining to perform the beam failure recovery procedure or the beam switch procedure is based on the comparing. Comparison component 940 may compare the reference signal to a threshold, where detecting the beam failure instance is based on the reference signal satisfying the threshold, and compare the quality of the reference signal to a threshold. In some cases, comparison component 940 may be a processor (e.g., a transceiver processor, or a radio processor, or a receiver processor). The processor may be coupled with memory and execute instructions stored in the memory that enable the processor to perform or facilitate the features discussed herein.

Measurement component 945 may measure a quality of a reference signal associated with the candidate beam. Measurement component 945 may measure a quality of the reference signal associated with the target beam. Measurement component 945 may measure a quality of a reference signal associated with each of the candidate beam and the target beam, and measure a quality of the reference signal. In some cases, measurement component 945 may be a processor (e.g., a transceiver processor, or a radio processor, or a receiver processor). The processor may be coupled with memory and execute instructions stored in the memory that enable the processor to perform or facilitate the features discussed herein. Suspension component 950 may suspend a remainder portion of the random access response window based on receiving the response via the target beam prior to the time period lapsing. Suspension component 950 may transmit, via a physical layer, an indication to an upper layer to receive a response from the base station, and suspend the remainder portion of the random access response window based at least in part on the indication. In some cases, suspension component 950 may be a processor (e.g., a transceiver processor, or a radio processor, or a receiver processor). The processor may be coupled with memory and execute instructions stored in the memory that enable the processor to perform or facilitate the features discussed herein.

Figure 10:
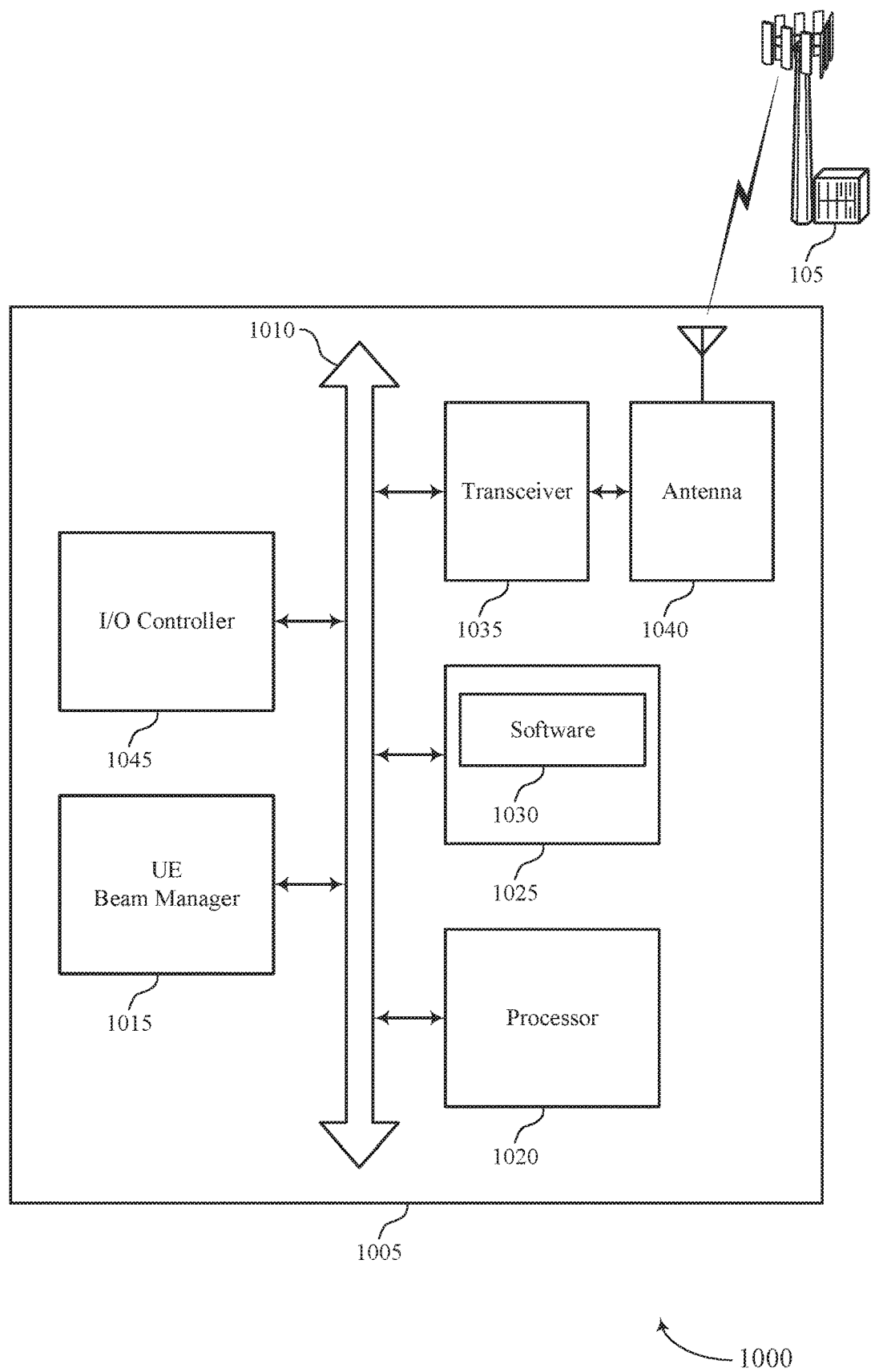
FIG. 10 illustrates a block diagram of a system including a UE that supports beam switch and beam failure recovery in accordance with aspects of the present disclosure.

FIG. 10 shows a diagram of a system 1000 including a wireless device 1005 that supports beam switch and beam failure recovery in accordance with aspects of the present disclosure. Wireless device 1005 may be an example of or include the components of wireless device 705, wireless device 805, or a UE 115 as described above, e.g., with reference to FIGS. 7 and 8. Wireless device 1005 may include components for bi-directional voice and data communications including components for transmitting and receiving communications, including UE beam manager 1015, processor 1020, memory 1025, software 1030, transceiver 1035, antenna 1040, and I/O controller 1045. These components may be coupled and in electronic communication via one or more buses (e.g., bus 1010). Wireless device 1005 may communicate wirelessly with one or more base stations 105.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting beam switch and beam failure recovery).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support beam switch and beam failure recovery. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas. In some cases, the wireless device 1005 may include a single antenna 1040. However, in some cases the wireless device 1005 may have more than one antenna 1040, which may be capable of concurrently transmitting or receiving multiple wireless transmissions.

I/O controller 1045 may manage input and output signals for wireless device 1005. I/O controller 1045 may also manage peripherals not integrated into wireless device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with wireless device 1005 via I/O controller 1045 or via hardware components controlled by I/O controller 1045.

Figure 11:
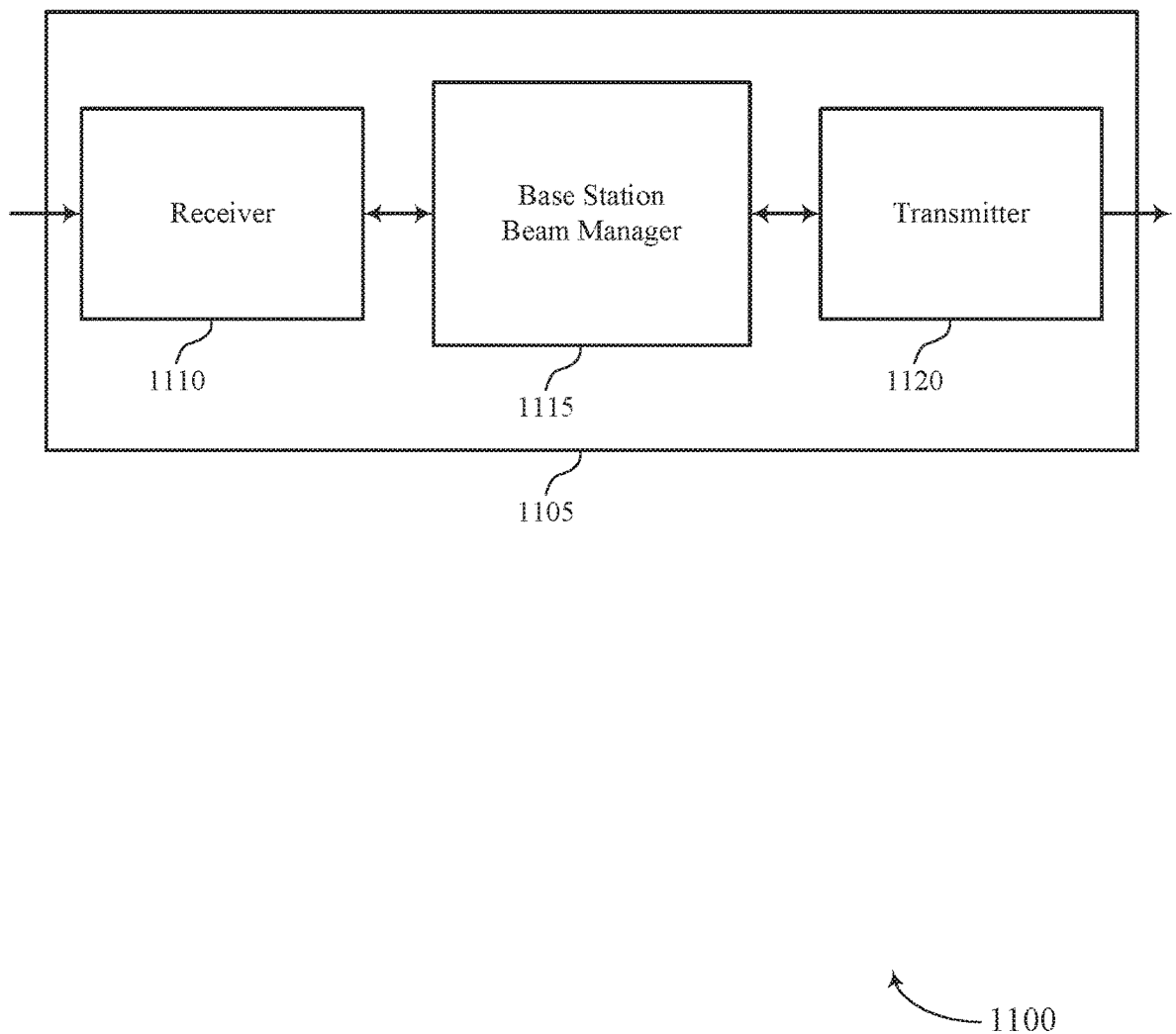
FIGS. 11 through 13 show block diagrams of a device that supports beam switch and beam failure recovery in accordance with aspects of the present disclosure.

FIG. 11 shows a block diagram 1100 of a wireless device 1105 that supports beam switch and beam failure recovery in accordance with aspects of the present disclosure. Wireless device 1105 may be an example of aspects of a base station 105 as described herein. Wireless device 1105 may include receiver 1110, base station beam manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, information related to beam switch and beam failure recovery, etc.). Information may be passed on to other components of the wireless device 1105. The receiver 1110 may be an example of aspects of the transceiver 1435 described with reference to FIG. 14. The receiver 1110 may utilize a single antenna or a set of antennas. Receiver 1110 may receive, from a UE 115, a preamble transmission over a candidate beam identified by the UE 115, after transmitting, to the UE 115, a beam switch message including beam switch timing information indicating the time period of the beam switch event, and a request for the UE 115 to switch from communicating with the base station 105 using an active beam to communicating with the base station 105 using a target beam.

Base station beam manager 1115 may be an example of aspects of the base station beam manager 1415 described with reference to FIG. 14. Base station beam manager 1115 and/or at least some of its various sub-components may be implemented in hardware, software executed by a processor, firmware, or any combination thereof. If implemented in software executed by a processor, the functions of the base station beam manager 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. In some cases, base station beam manager 1115 may be a processor (e.g., a transceiver processor, or a radio processor, or a receiver processor). The processor may be coupled with memory and execute instructions stored in the memory that enable the processor to perform or facilitate the communication pattern identification features discussed herein. A transceiver processor may be collocated with and/or communicate with (e.g., direct the operations of) a transceiver of the wireless device 1105. A radio processor may be collocated with and/or communicate with (e.g., direct the operations of) a radio (e.g., an LTE radio or a Wi-Fi radio) of the wireless device 1105. A receiver processor may be collocated with and/or communicate with (e.g., direct the operations of) a receiver of the wireless device 1105.

The base station beam manager 1115 and/or at least some of its various sub-components may be physically located at various positions, including being distributed such that portions of functions are implemented at different physical locations by one or more physical devices. In some examples, base station beam manager 1115 and/or at least some of its various sub-components may be a separate and distinct component in accordance with various aspects of the present disclosure. In other examples, base station beam manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station beam manager 1115 may identify the target beam based on a beam failure indication, and configure a time period of the beam switch event via RRC signaling.

Transmitter 1120 may transmit signals generated by other components of the wireless device 1105. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas.

Transmitter 1120 may transmit, to the UE, the beam switch message including beam switch timing information indicating the time period of the beam switch event, and a request for the UE 115 to switch from communicating with the base station 105 using the active beam to communicating with the base station 105 using the target beam. Transmitter 1120 may transmit a response to the UE 115 with at least a control signal over the candidate beam or the target beam. Transmitter 1120 may transmit, to the UE 115, the response via the candidate beam during a portion of a random access response window and prior to the beam switch event. Transmitter 1120 may transmit, to the UE 115, the response via the candidate beam after the time period of the beam switch event lapsing and within the random access response window. Transmitter 1120 may transmit, to the UE 115, the response via the target beam, prior to of the time period of the beam switch event lapsing.

Figure 12:
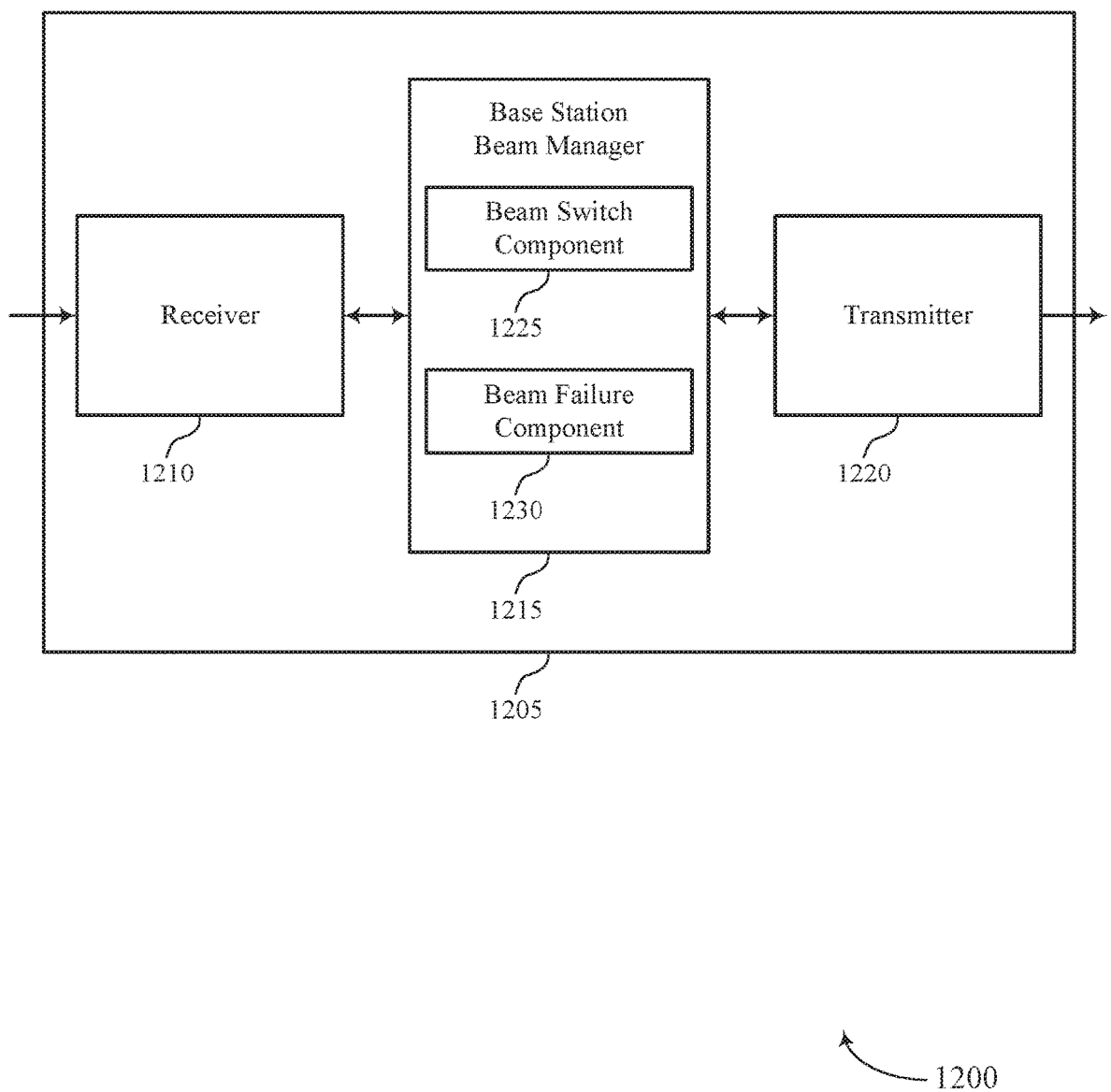

FIG. 12 shows a block diagram 1200 of a wireless device 1205 that supports beam switch and beam failure recovery in accordance with aspects of the present disclosure. Wireless device 1205 may be an example of aspects of a wireless device 1105 or a base station 105 as described with reference to FIG. 11. Wireless device 1205 may include receiver 1210, base station beam manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, information related to beam switch and beam failure recovery, etc.). Information may be passed on to other components of the wireless device 1205. The receiver 1210 may be an example of aspects of the transceiver 1435 described with reference to FIG. 14. The receiver 1210 may utilize a single antenna or a set of antennas.

Base station beam manager 1215 may be an example of aspects of the base station beam manager 1415 described with reference to FIG. 14. Base station beam manager 1215 may also include beam switch component 1225 and beam failure component 1230. In some cases, base station beam manager 1215 may be a processor (e.g., a transceiver processor, or a radio processor, or a receiver processor) may implement some or all of the operations of base station beam manager 1215. The processor may be coupled with memory and execute instructions stored in the memory that enable the processor to perform or facilitate the communication pattern identification features discussed herein. A transceiver processor may be collocated with and/or communicate with (e.g., direct the operations of) a transceiver of the wireless device 1205. A radio processor may be collocated with and/or communicate with (e.g., direct the operations of) a radio (e.g., an LTE radio or a Wi-Fi radio) of the wireless device 1205. A receiver processor may be collocated with and/or communicate with (e.g., direct the operations of) a receiver of the wireless device 1205.

Beam switch component 1225 may identify a target beam based on a beam failure indication and perform a beam switch procedure with a UE 115 during a beam switch event. Beam switch component 1225 may ignore the beam switch event based at least in part on transmitting the response to the UE 115 over the candidate beam prior to the beam switch event. In some cases, beam switch component 1225 may be a processor (e.g., a transceiver processor, or a radio processor, or a receiver processor). The processor may be coupled with memory and execute instructions stored in the memory that enable the processor to perform or facilitate the features discussed herein. Beam failure component 1230 may perform a beam failure recovery procedure with the UE 115 based on a quality of a reference signal satisfying a threshold and identify a target beam based on the beam failure indication. In some cases, the reference signal includes an SSB reference signal, or a PBCH block reference signal, or a CSI reference signal, or an SRS, or a BRS, or a BRRS, or a TRS, or a combination thereof. In some cases, the threshold includes an RSRP, an RSRQ, or a BLER, or a combination thereof. In some cases, beam failure component 1230 may be a processor (e.g., a transceiver processor, or a radio processor, or a receiver processor). The processor may be coupled with memory and execute instructions stored in the memory that enable the processor to perform or facilitate the features discussed herein.

Transmitter 1220 may transmit signals generated by other components of the wireless device 1205. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
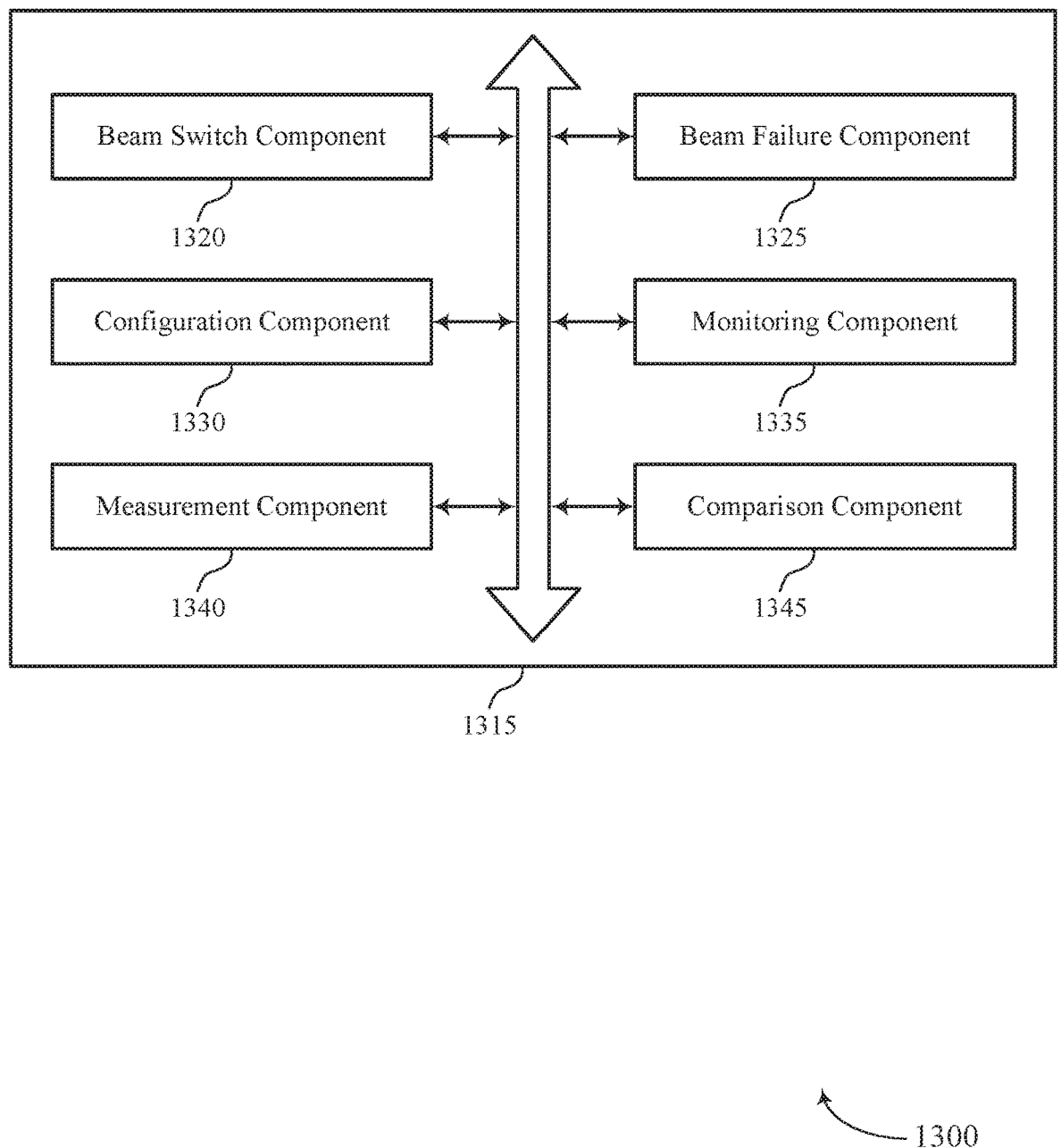

FIG. 13 shows a block diagram 1300 of a base station beam manager 1315 that supports beam switch and beam failure recovery in accordance with aspects of the present disclosure. The base station beam manager 1315 may be an example of aspects of a base station beam manager 1115, 1215, and 1415 as described herein with reference to FIGS. 11, 12, and 14. The base station beam manager 1315 may include beam switch component 1320, beam failure component 1325, configuration component 1330, monitoring component 1335, measurement component 1340, and comparison component 1345. Each of these modules may communicate, directly or indirectly, with one another (e.g., via one or more buses). In some cases, base station beam manager 1315 may be a processor (e.g., a transceiver processor, or a radio processor, or a receiver processor). The processor may be coupled with memory and execute instructions stored in the memory that enable the processor to perform or facilitate the communication pattern identification features discussed herein. A transceiver processor may be collocated with and/or communicate with (e.g., direct the operations of) a transceiver of the device. A radio processor may be collocated with and/or communicate with (e.g., direct the operations of) a radio (e.g., an LTE radio or a Wi-Fi radio) of the device. A receiver processor may be collocated with and/or communicate with (e.g., direct the operations of) a receiver of the device.

Beam switch component 1320 may identify a target beam based on a beam failure indication and perform a beam switch procedure with a UE 115 during a beam switch event. Beam switch component 1320 may ignore the beam switch event based at least in part on transmitting the response to the UE 115 over the candidate beam prior to the beam switch event. In some cases, beam switch component 1320 may be a processor (e.g., a transceiver processor, or a radio processor, or a receiver processor). The processor may be coupled with memory and execute instructions stored in the memory that enable the processor to perform or facilitate the features discussed herein. Beam failure component 1325 may perform a beam failure recovery procedure with the UE 115 based on a quality of the reference signal satisfying a threshold and identify a target beam based on the beam failure indication. In some cases, the reference signal includes an SSB reference signal, or a PBCH block reference signal, or a CSI reference signal, or an SRS, or a BRS, or a BRRS, or a TRS, or a combination thereof. In some cases, beam failure component 1325 may be a processor (e.g., a transceiver processor, or a radio processor, or a receiver processor). The processor may be coupled with memory and execute instructions stored in the memory that enable the processor to perform or facilitate the features discussed herein. Configuration component 1330 may configure beam failure recovery control channel for transmitting a response to the UE 115 using a candidate beam. In some cases, configuration component 1330 may be a processor (e.g., a transceiver processor, or a radio processor, or a receiver processor). The processor may be coupled with memory and execute instructions stored in the memory that enable the processor to perform or facilitate the features discussed herein.

Monitoring component 1335 may monitor a reference signal associated with the target beam, where the reference signal is received prior to the time period of the beam switch event lapsing. In some cases, monitoring component 1335 may be a processor (e.g., a transceiver processor, or a radio processor, or a receiver processor). The processor may be coupled with memory and execute instructions stored in the memory that enable the processor to perform or facilitate the features discussed herein. Measurement component 1340 may measure a quality of the reference signal. In some cases, measurement component 1340 may be a processor (e.g., a transceiver processor, or a radio processor, or a receiver processor). The processor may be coupled with memory and execute instructions stored in the memory that enable the processor to perform or facilitate the features discussed herein. Comparison component 1345 may compare the quality of the reference signal to a threshold. In some cases, the threshold includes an RSRP, an RSRQ, or a BLER, or a combination thereof. In some cases, comparison component 1345 may be a processor (e.g., a transceiver processor, or a radio processor, or a receiver processor). The processor may be coupled with memory and execute instructions stored in the memory that enable the processor to perform or facilitate the features discussed herein.

Figure 14:
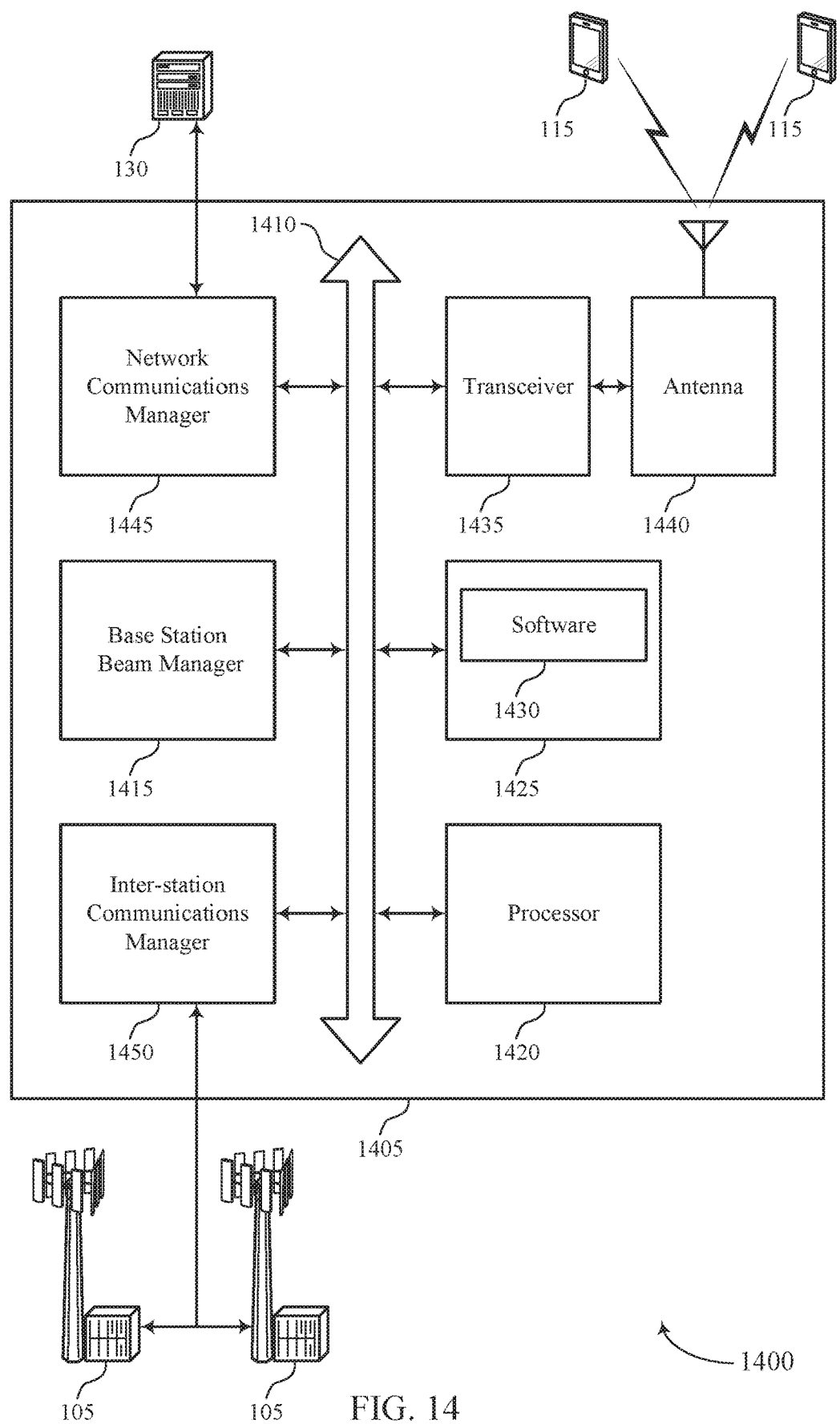
FIG. 14 illustrates a block diagram of a system including a base station that supports beam switch and beam failure recovery in accordance with aspects of the present disclosure.

FIG. 14 shows a diagram of a system 1400 including a wireless device 1405 that supports beam switch and beam failure recovery in accordance with aspects of the present disclosure. Wireless device 1405 may be an example of or include the components of base station 105 as described above, e.g., with reference to FIG. 1. Wireless device 1405 may include components for bi-directional voice and data communications including components for transmitting and receiving communications, including base station beam manager 1415, processor 1420, memory 1425, software 1430, transceiver 1435, antenna 1440, network communications manager 1445, and inter-station communications manager 1450. These components may be coupled and in electronic communication via one or more buses (e.g., bus 1410). Wireless device 1405 may communicate wirelessly with one or more UEs 115.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting beam switch and beam failure recovery).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware or software operation such as the interaction with peripheral components or devices.

Software 1430 may include code to implement aspects of the present disclosure, including code to support beam switch and beam failure recovery. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas. In some cases, the wireless device 1405 may include a single antenna 1440. However, in some cases the wireless device 1405 may have more than one antenna 1440, which may be capable of concurrently transmitting or receiving multiple wireless transmissions.

Network communications manager 1445 may manage communications with the core network (e.g., via one or more wired backhaul links). For example, the network communications manager 1445 may manage the transfer of data communications for client devices, such as one or more UEs 115.

Inter-station communications manager 1450 may manage communications with other base station 105, and may include a controller or scheduler for controlling communications with UEs 115 in cooperation with other base stations 105. For example, the inter-station communications manager 1450 may coordinate scheduling for transmissions to UEs 115 for various interference mitigation techniques such as beamforming or joint transmission. In some examples, inter-station communications manager 1450 may provide an X2 interface within an Long Term Evolution (LTE)/LTE-A wireless communication network technology to provide communication between base stations 105.

Figure 15:
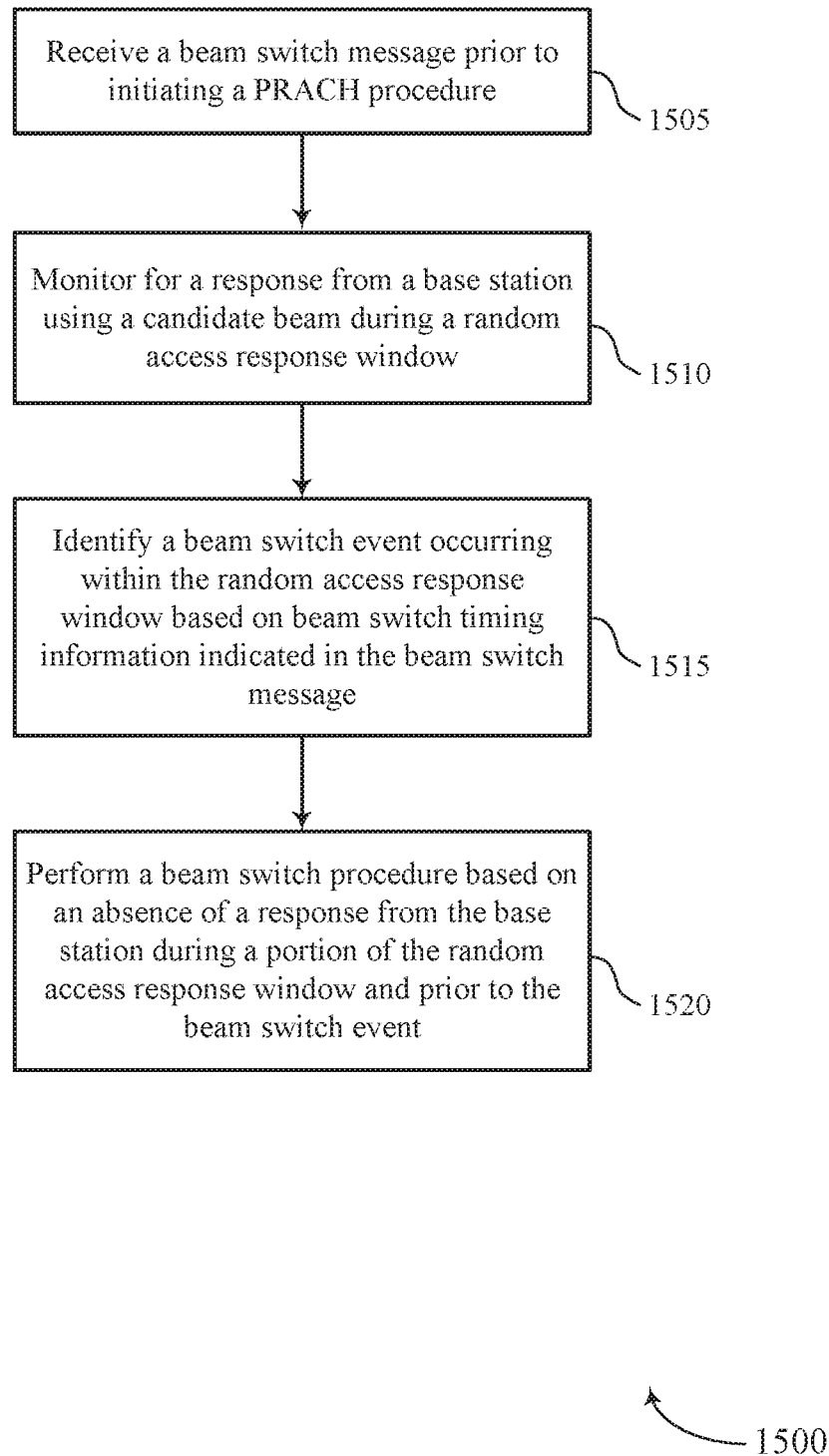
FIGS. 15 through 19 illustrate methods for beam switch and beam failure recovery in accordance with aspects of the present disclosure.

FIG. 15 shows a flowchart illustrating a method 1500 for beam switch and beam failure recovery in accordance with aspects of the present disclosure. The operations of method 1500 may be implemented by a UE 115 or its components as described herein. For example, the operations of method 1500 may be performed by a UE beam manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At 1505, the UE 115 may receive a beam switch message prior to initiating a PRACH procedure. The operations of 1505 may be performed according to the methods described herein. In some examples, aspects of the operations of 1505 may be performed by a receiver as described with reference to FIGS. 7 through 10.

At 1510, the UE 115 may monitor for a response from a base station 105 using a candidate beam during a random access response window. The operations of 1510 may be performed according to the methods described herein. In some examples, aspects of the operations of 1510 may be performed by a monitoring component as described with reference to FIGS. 7 through 10.

At 1515, the UE 115 may identify a beam switch event occurring within the random access response window based on beam switch timing information indicated in the beam switch message. The operations of 1515 may be performed according to the methods described herein. In some examples, aspects of the operations of 1515 may be performed by a beam switch component as described with reference to FIGS. 7 through 10.

At 1520, the UE 115 may perform a beam switch procedure based on an absence of a response from the base station 105 during a portion of the random access response window and prior to the beam switch event. The operations of 1520 may be performed according to the methods described herein. In some examples, aspects of the operations of 1520 may be performed by a beam switch component as described with reference to FIGS. 7 through 10.

Figure 16:
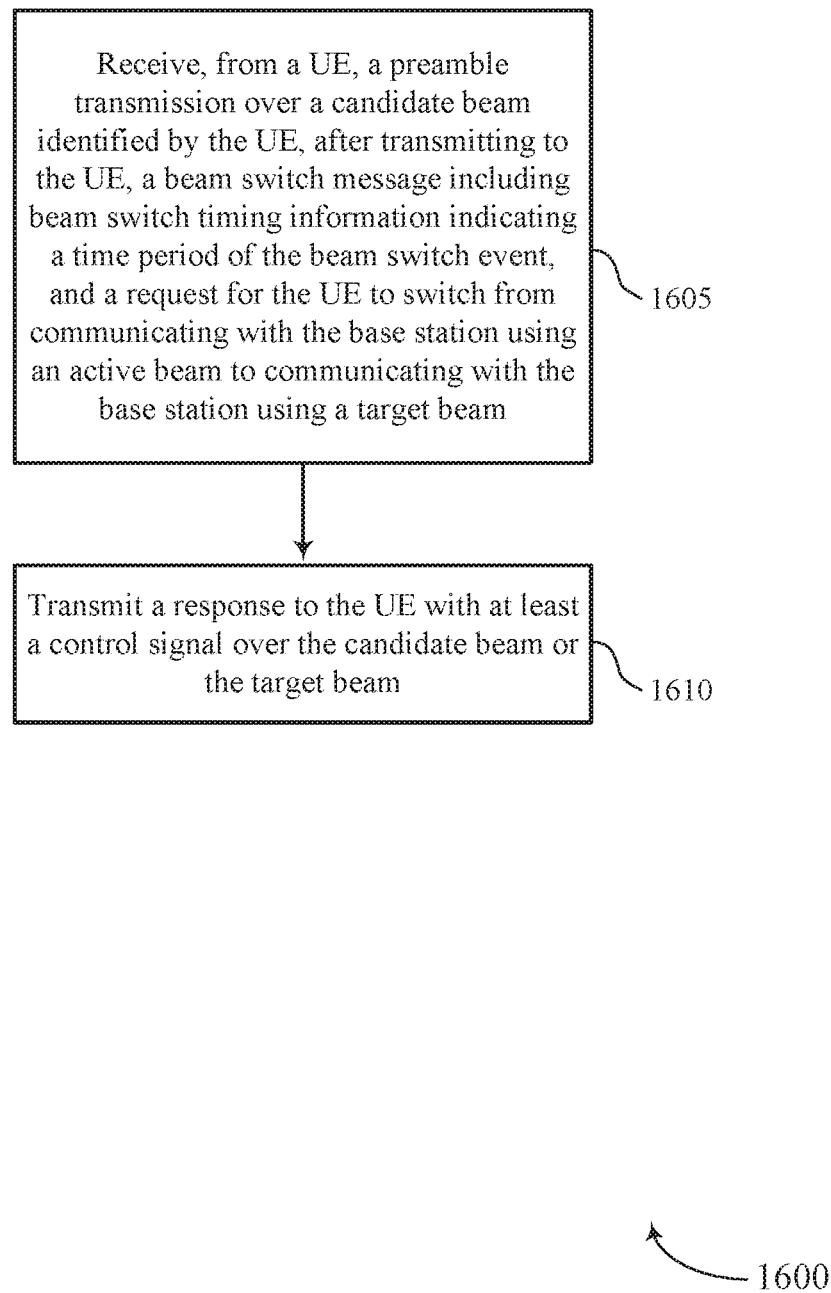

FIG. 16 shows a flowchart illustrating a method 1600 for beam switch and beam failure recovery in accordance with aspects of the present disclosure. The operations of method 1600 may be implemented by a base station 105 or its components as described herein. For example, the operations of method 1600 may be performed by a base station beam manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At 1605, the base station 105 may receive, from a UE 115, a preamble transmission over a candidate beam identified by the UE 115, after transmitting to the UE 115, a beam switch message including beam switch timing information indicating a time period of the beam switch event, and a request for the UE 115 to switch from communicating with the base station 105 using an active beam to communicating with the base station 105 using a target beam. The operations of 1605 may be performed according to the methods described herein. In some examples, aspects of the operations of 1605 may be performed by a receiver as described with reference to FIGS. 11 through 14.

At 1610, the base station 105 may transmit a response to the UE 115 with at least a control signal over the candidate beam or the target beam. The operations of 1620 may be performed according to the methods described herein. In some examples, aspects of the operations of 1620 may be performed by a transmitter as described with reference to FIGS. 11 through 14.

Figure 17:
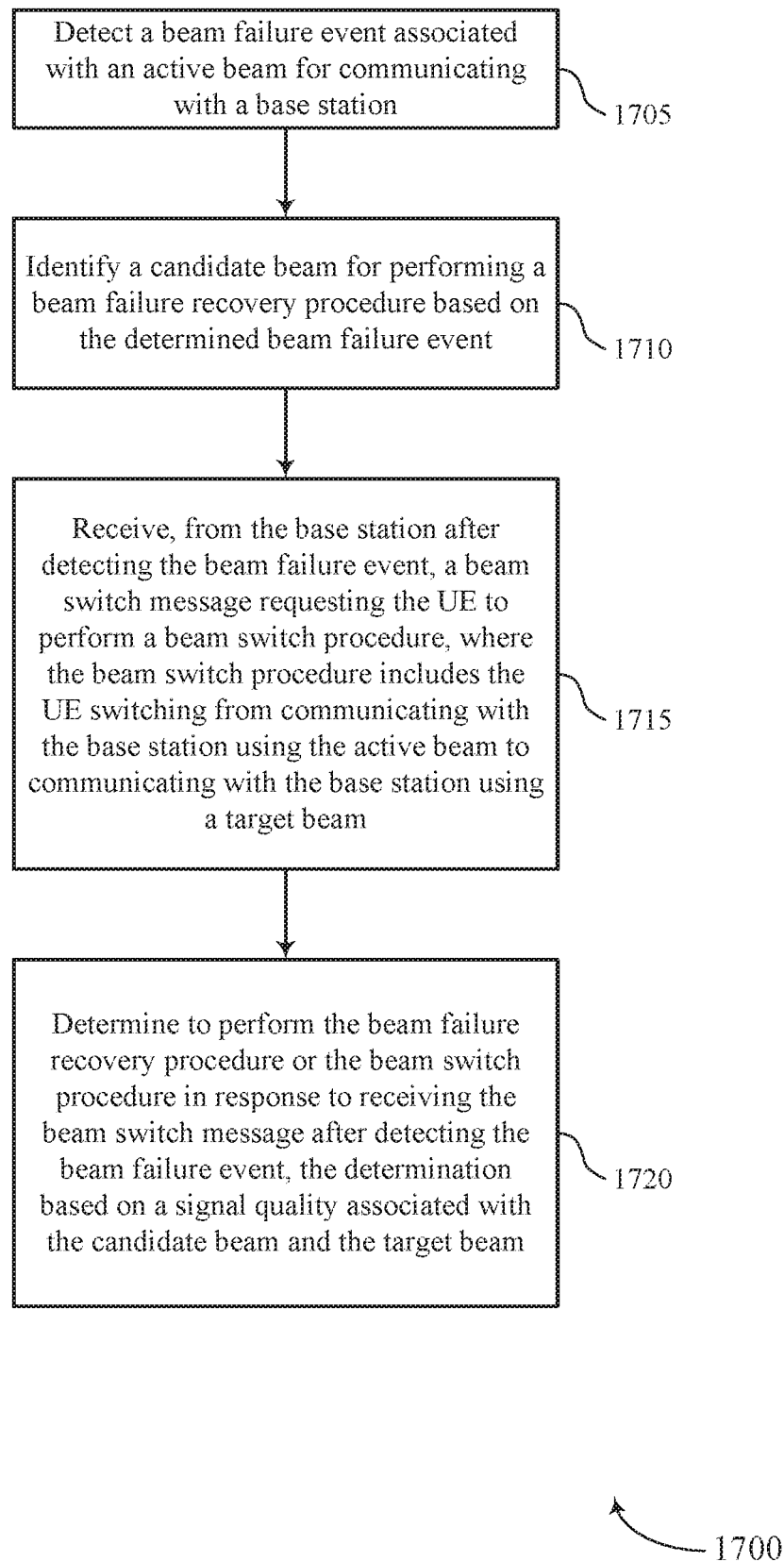

FIG. 17 shows a flowchart illustrating a method 1700 for beam switch and beam failure recovery in accordance with aspects of the present disclosure. The operations of method 1700 may be implemented by a UE 115 or its components as described herein. For example, the operations of method 1700 may be performed by a UE beam manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At 1705, the UE 115 may detect a beam failure event associated with an active beam for communicating with a base station. The operations of 1705 may be performed according to the methods described herein. In some examples, aspects of the operations of 1705 may be performed by a beam failure component as described with reference to FIGS. 7 through 10.

At 1710, the UE 115 may identify a candidate beam for performing a beam failure recovery procedure based on the determined beam failure event. The operations of 1710 may be performed according to the methods described herein. In some examples, aspects of the operations of 1710 may be performed by a beam failure component as described with reference to FIGS. 7 through 10.

At 1715, the UE 115 may receive, from the base station 105 after detecting the beam failure event, a beam switch message requesting the UE 115 to perform a beam switch procedure, the beam switch procedure includes the UE 115 switching from communicating with the base station 105 using the active beam to communicating with the base station 105 using a target beam. The operations of 1715 may be performed according to the methods described herein. In some examples, aspects of the operations of 1715 may be performed by a receiver as described with reference to FIGS. 7 through 10.

At 1720, the UE 115 may determine to perform the beam failure recovery procedure or the beam switch procedure in response to receiving the beam switch message after detecting the beam failure event, where the determination may be based on a signal quality associated with the candidate beam and the target beam. The operations of 1720 may be performed according to the methods described herein. In some examples, aspects of the operations of 1720 may be performed by a comparison component as described with reference to FIGS. 7 through 10.

Figure 18:
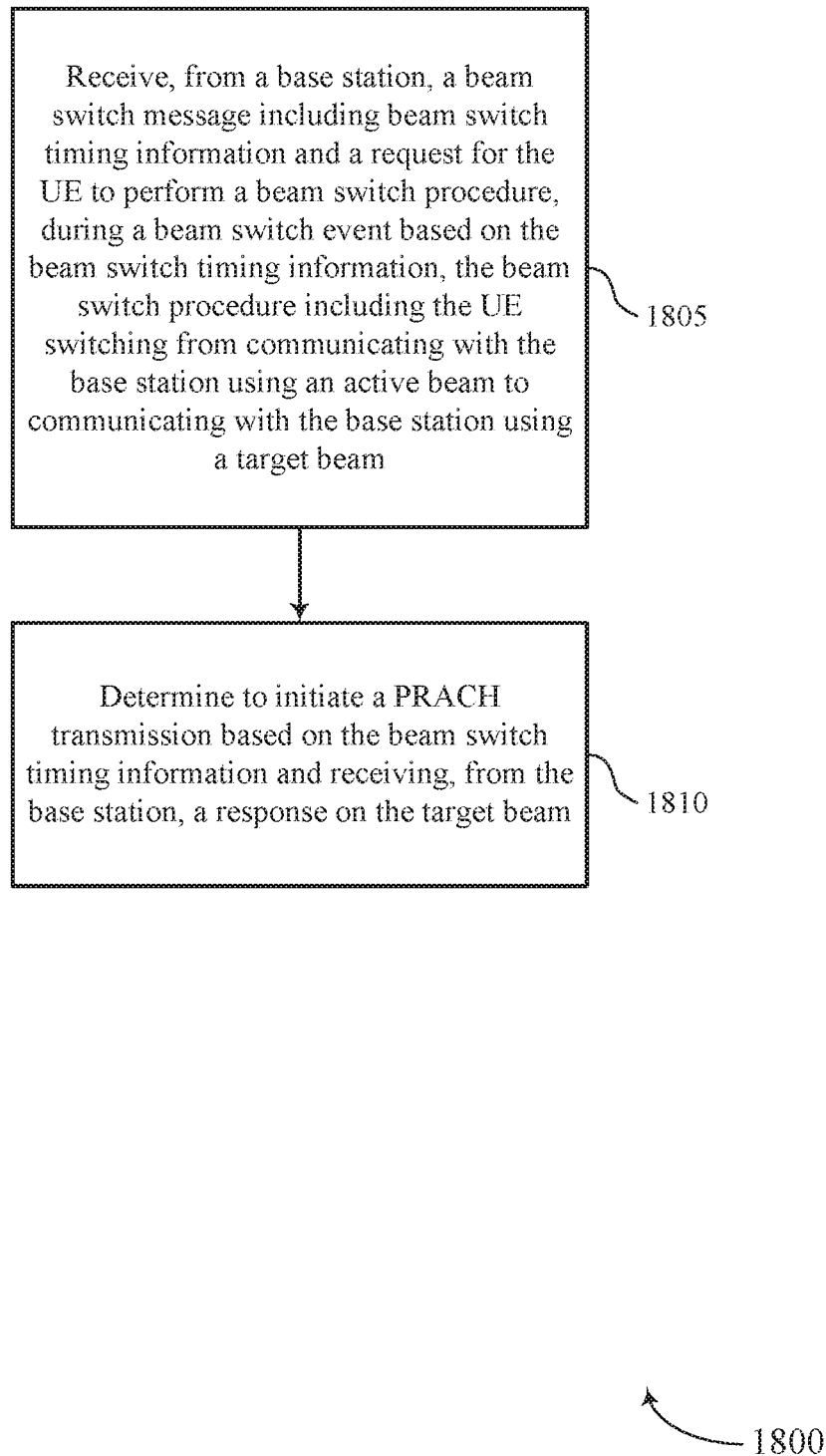

FIG. 18 shows a flowchart illustrating a method 1800 for beam switch and beam failure recovery in accordance with aspects of the present disclosure. The operations of method 1800 may be implemented by a UE 115 or its components as described herein. For example, the operations of method 1800 may be performed by a UE beam manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At 1805, the UE 115 may receive, from a base station, a beam switch message including beam switch timing information and a request for the UE 115 to perform a beam switch procedure, during a beam switch event based on the beam switch timing information, the beam switch procedure including the UE 115 switching from communicating with the base station 105 using an active beam to communicating with the base station 105 using a target beam. The operations of 1805 may be performed according to the methods described herein. In some examples, aspects of the operations of 1805 may be performed by a receiver as described with reference to FIGS. 7 through 10.

At 1810, the UE 115 may determine to initiate a PRACH transmission based on the beam switch timing information and receiving, from the base station, a response on the target beam. The operations of 1810 may be performed according to the methods described herein. In some examples, aspects of the operations of 1810 may be performed by a PRACH component as described with reference to FIGS. 7 through 10.

Figure 19:
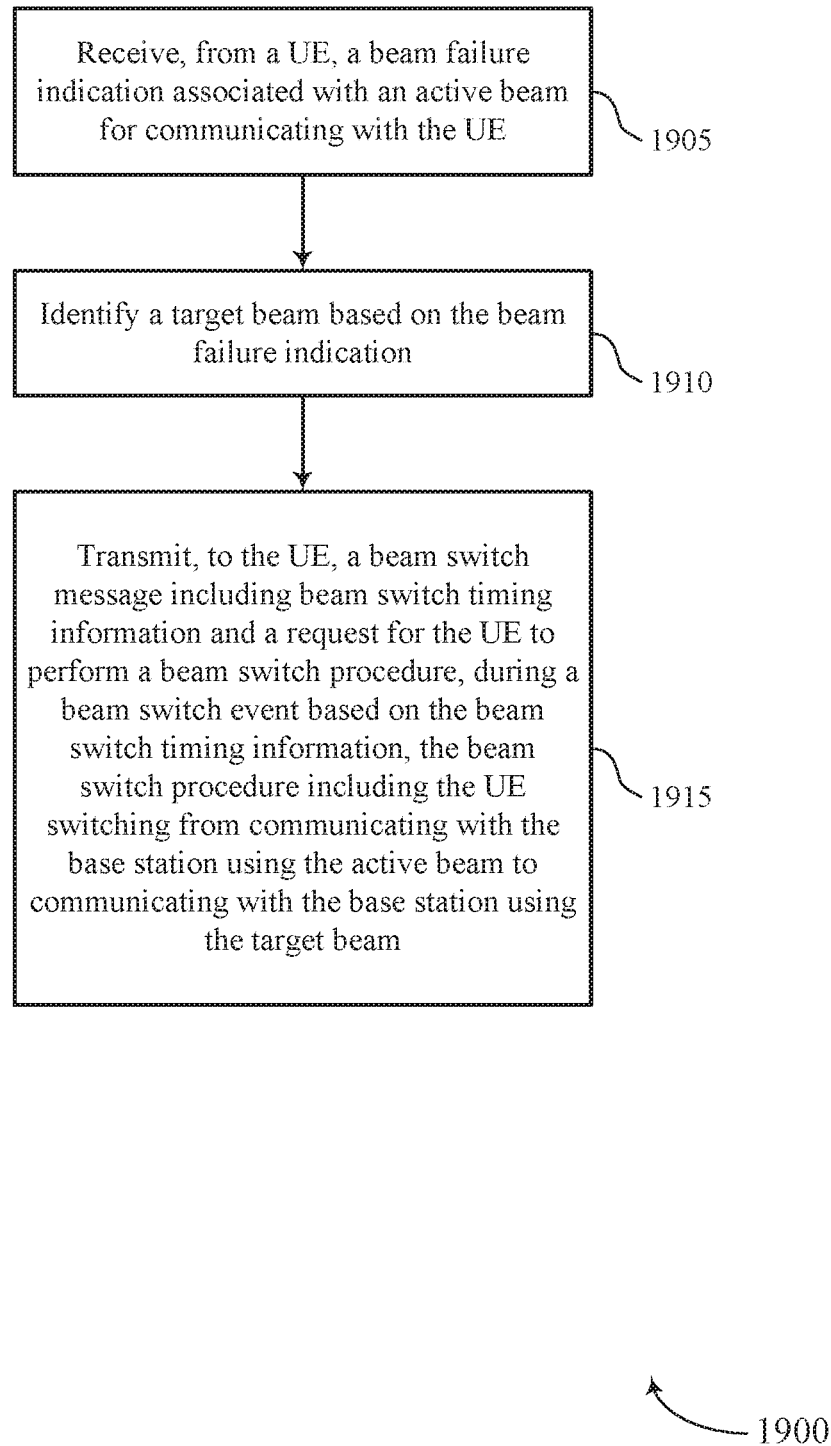

FIG. 19 shows a flowchart illustrating a method 1900 for beam switch and beam failure recovery in accordance with aspects of the present disclosure. The operations of method 1900 may be implemented by a base station 105 or its components as described herein. For example, the operations of method 1900 may be performed by a base station beam manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At 1905, the base station 105 may receive, from a UE, a beam failure indication associated with an active beam for communicating with the UE. The operations of 1905 may be performed according to the methods described herein. In some examples, aspects of the operations of 1905 may be performed by a receiver as described with reference to FIGS. 11 through 14.

At 1910, the base station 105 may identify a target beam based on the beam failure indication. The operations of 1910 may be performed according to the methods described herein. In some examples, aspects of the operations of 1910 may be performed by a beam failure component as described with reference to FIGS. 11 through 14.

At 1915, the base station 105 may transmit, to the UE 115, a beam switch message including beam switch timing information and a request for the UE 115 to perform a beam switch procedure, during a beam switch event based on the beam switch timing information, the beam switch procedure including the UE 115 switching from communicating with the base station 105 using the active beam to communicating with the base station 105 using the target beam. The operations of 1915 may be performed according to the methods described herein. In some examples, aspects of the operations of 1915 may be performed by a transmitter as described with reference to FIGS. 11 through 14.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving a beam switch message prior to initiating a physical random access channel (PRACH) procedure;
   monitoring for a response from a base station using a candidate beam during a random access response window;
   identifying a beam switch event occurring within the random access response window based at least in part on beam switch timing information indicated in the beam switch message; and
   performing a beam switch procedure based at least in part on an absence of a response from the base station during a portion of the random access response window and prior to the beam switch event.

2. The method of claim 1, further comprising:
   monitoring, after initiating the physical random access channel (PRACH) procedure, a search space of a control resource set for downlink control information for the UE.

3. The method of claim 2, wherein monitoring for the response from the base station using the candidate beam comprises:
   monitoring at least one control channel element of the control resource set for the response.

4. The method of claim 2, further comprising:
   monitoring the search space for the downlink control information prior to initiating the PRACH procedure.

5. The method of claim 1, further comprising:
   receiving, from the base station, the response via the candidate beam prior to the beam switch event; and
   ignoring the beam switch event based at least in part on receiving the response prior to the beam switch event.

6. The method of claim 1, further comprising:
   triggering the PRACH procedure based at least in part on a beam failure event.

7. The method of claim 1, further comprising:
   monitoring for a response via a target beam indicated in the beam switch message, from the base station, during a time period associated with the beam switch event.

8. The method of claim 7, further comprising:
   receiving, from the base station, the response via the target beam, prior to the time period associated with a beam switch lapsing.

9. The method of claim 8, further comprising:
   suspending a remainder portion of the random access response window based at least in part on receiving the response via the target beam prior to the time period associated with the beam switch event lapsing.

10. The method of claim 9, further comprising:
    transmitting, via a physical layer, an indication to an upper layer to receive a response from the base station, wherein suspending the remainder portion of the random access response window is based at least in part on the indication.

11. The method of claim 8, further comprising:
continuing monitoring for the response, from the base station during a remainder portion of the random access response window using the candidate beam.

12. The method of claim 1, further comprising:
detecting a beam failure instance associated with an active beam;
incrementing a beam failure counter based at least in part on the detected beam failure instance;
determining whether the beam failure counter meets a maximum beam failure threshold;
determining a beam failure event based at least in part on the beam failure counter meeting the maximum beam failure threshold; and
triggering a beam failure recovery procedure based at least in part on the determined beam failure event.

13. An apparatus for wireless communication at a user equipment (UE), comprising:
a processor;
memory coupled with the processor; and
instructions stored in the memory and operable, when executed by the processor, to cause the apparatus to:
receive a beam switch message prior to initiating a physical random access channel (PRACH) procedure;
monitor for a response from a base station using a candidate beam during a random access response window;
identify a beam switch event occurring within the random access response window based at least in part on beam switch timing information indicated in the beam switch message; and
perform a beam switch procedure based at least in part on an absence of a response from the base station during a portion of the random access response window and prior to the beam switch event.

14. The apparatus of claim 13, wherein the instructions are further operable, when executed by the processor, to cause the apparatus to:
monitor, after initiating the physical random access channel (PRACH) procedure, a search space of a control resource set for downlink control information for the UE.

15. The apparatus of claim 14, wherein the instructions are further executable by the processor to monitor for the response from the base station using the candidate beam by being executable by the processor to:
monitor at least one control channel element of the control resource set for the response.

16. The apparatus of claim 14, wherein the instructions are further operable, when executed by the processor, to cause the apparatus to:
monitor the search space for the downlink control information prior to initiating the PRACH procedure.

17. The apparatus of claim 13, wherein the instructions are further operable, when executed by the processor, to cause the apparatus to:
receive, from the base station, the response via the candidate beam prior to the beam switch event; and
ignore the beam switch event based at least in part on receiving the response prior to the beam switch event.

18. The apparatus of claim 13, wherein the instructions are further operable, when executed by the processor, to cause the apparatus to:

trigger the PRACH procedure based at least in part on a beam failure event.

19. The apparatus of claim 13, wherein the instructions are further operable, when executed by the processor, to cause the apparatus to:
monitor for a response via a target beam indicated in the beam switch message, from the base station, during a time period associated with the beam switch event.

20. The apparatus of claim 19, wherein the instructions are further operable, when executed by the processor, to cause the apparatus to:
receive, from the base station, the response via the target beam, prior to the time period associated with a beam switch lapsing.

21. The apparatus of claim 20, wherein the instructions are further operable, when executed by the processor, to cause the apparatus to:
suspend a remainder portion of the random access response window based at least in part on receiving the response via the target beam prior to the time period associated with the beam switch event lapsing.

22. The apparatus of claim 21, wherein the instructions are further operable, when executed by the processor, to cause the apparatus to:
transmit, via a physical layer, an indication to an upper layer to receive a response from the base station, wherein suspending the remainder portion of the random access response window is based at least in part on the indication.

23. The apparatus of claim 20, wherein the instructions are further operable, when executed by the processor, to cause the apparatus to:
continue monitoring for the response, from the base station during a remainder portion of the random access response window using the candidate beam.

24. The apparatus of claim 13, wherein the instructions are further operable, when executed by the processor, to cause the apparatus to:
detect a beam failure instance associated with an active beam;
increment a beam failure counter based at least in part on the detected beam failure instance;
determine whether the beam failure counter meets a maximum beam failure threshold;
determine a beam failure event based at least in part on the beam failure counter meeting the maximum beam failure threshold; and
trigger a beam failure recovery procedure based at least in part on the determined beam failure event.

25. An apparatus for wireless communication at a user equipment (UE), comprising:
means for receiving a beam switch message prior to initiating a physical random access channel (PRACH) procedure;
means for monitoring for a response from a base station using a candidate beam during a random access response window;
means for identifying a beam switch event occurring within the random access response window based at least in part on beam switch timing information indicated in the beam switch message; and
means for performing a beam switch procedure based at least in part on an absence of a response from the base station during a portion of the random access response window and prior to the beam switch event.

26. The apparatus of claim 25, further comprising
means for monitoring, after initiating the physical random access channel (PRACH) procedure, a search space of a control resource set for downlink control information for the UE.

27. The apparatus of claim 26, further comprising
means for monitoring at least one control channel element of the control resource set for the response.

28. The apparatus of claim 26, further comprising
monitoring the search space for the downlink control information prior to initiating the PRACH procedure.

29. The apparatus of claim 26, further comprising
means for receiving, from the base station, the response via the candidate beam prior to the beam switch event; and
means for ignoring the beam switch event based at least in part on receiving the response prior to the beam switch event.

30. A non-transitory computer-readable medium storing code for wireless communication at a user equipment (UE), the code comprising instructions executable by a processor to:
receive a beam switch message prior to initiating a physical random access channel (PRACH) procedure;
monitor for a response from a base station using a candidate beam during a random access response window;
identify a beam switch event occurring within the random access response window based at least in part on beam switch timing information indicated in the beam switch message; and
perform a beam switch procedure based at least in part on an absence of a response from the base station during a portion of the random access response window and prior to the beam switch event.

* * * * *